United States Patent
Ishiguro et al.

(10) Patent No.: US 6,922,626 B2
(45) Date of Patent: Jul. 26, 2005

(54) CONTROL APPARATUS FOR EXHAUST GAS RECIRCULATION VALVE

(75) Inventors: Tetsuya Ishiguro, Wako (JP); Shusuke Akazaki, Wako (JP); Yuji Yasui, Wako (JP); Takahide Mizuno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/778,242

(22) Filed: Feb. 17, 2004

(65) Prior Publication Data

US 2004/0168680 A1 Sep. 2, 2004

(30) Foreign Application Priority Data

Feb. 27, 2003 (JP) ........................................ 2003-051594

(51) Int. Cl.$^7$ ............................................. F02M 25/07
(52) U.S. Cl. .................... 701/108; 123/568.21
(58) Field of Search ....................... 123/568.11, 568.21, 123/568.22, 568.23, 568.24, 568.25, 568.26, 568.27, 568.28; 701/108; 60/605.2

(56) References Cited

U.S. PATENT DOCUMENTS

| | | | | |
|---|---|---|---|---|
| 5,934,249 A | * | 8/1999 | Nanba et al. | 123/568.21 |
| 6,032,656 A | * | 3/2000 | Itoyama et al. | 123/568.21 |

FOREIGN PATENT DOCUMENTS

| | | | | |
|---|---|---|---|---|
| JP | 9-31768 A | * | 12/1997 | 701/108 |
| JP | 2002-138907 A | * | 5/2002 | 701/108 |
| JP | 2002-235606 | | 8/2002 | |

* cited by examiner

Primary Examiner—Willis R. Wolfe, Jr.
(74) Attorney, Agent, or Firm—Squire, Sanders & Dempsey L.L.P.

(57) ABSTRACT

A control apparatus for an exhaust gas recirculation valve is disclosed. The exhaust gas recirculation valve is provided in an exhaust gas recirculation pipe for recirculating exhaust gases from an internal combustion engine to an intake system of the engine. The exhaust gas recirculation valve controls an exhaust gas recirculation amount. An opening of the exhaust gas recirculation valve is controlled to a target opening, based on a controlled object model which is obtained by modeling the exhaust gas recirculation valve.

20 Claims, 18 Drawing Sheets

CONTROL APPARATUS FOR EXHAUST GAS RECIRCULATION VALVE

BACKGROUND OF THE INVENTION

1. Field of the Invention

The present invention relates to a control apparatus for an exhaust gas recirculation valve which is provided in an exhaust gas recirculation pipe for recirculating exhaust gases from an internal combustion engine to an intake system of the engine, and controls an exhaust gas recirculation amount.

2. Description of the Related Art

It is important for maintaining good exhaust characteristics to accurately and quickly control an opening of the exhaust gas recirculation valve which controls an exhaust gas recirculation amount of the internal combustion engine to a target opening. Therefore, Japanese Laid-open Patent Publication No. 2002-235606 shows a control apparatus in which an opening of the exhaust gas recirculation valve which is detected when the target opening is "0 (the fully-closed opening)" is learned as the fully-closed opening, the detected opening is corrected using the learned fully-closed opening, and the exhaust gas recirculation valve is controlled to the target opening according to the corrected detected opening.

According to the apparatus shown in the above publication, it is possible to maintain good control accuracy at a small opening even if there is aging in the opening characteristic of the exhaust gas recirculation valve. However, there is a problem described below when the exhaust gas recirculation valve is enlarged and the exhaust gas recirculation flow rate is controlled from a low flow rate to a high flow rate by only one large-size exhaust gas recirculation valve.

That is, good control accuracy at a very small opening (about 0.5 mm of the lift amount) is necessary for accurately controlling a low flow rate. However, good control accuracy in the small opening region of the large-size exhaust gas recirculation valve cannot be obtained.

SUMMARY OF THE INVENTION

An object of the present invention is to provide a control apparatus for an exhaust gas recirculation valve, which can improve the control accuracy of the exhaust gas recirculation valve, and achieve enough control accuracy even in the small opening region of the large-size exhaust gas recirculation valve.

To attain the above object, an example of the present invention provides a control apparatus for an exhaust gas recirculation valve (22) which is provided in an exhaust gas recirculation pipe (21) for recirculating exhaust gases from an internal combustion engine to an intake system of the engine. The exhaust gas recirculation valve (22) controls an exhaust gas recirculation amount. The control apparatus can include control means (41) for controlling an opening (LACT) of the exhaust gas recirculation valve (22) to a target opening (LCMD) based on a controlled object model which is obtained by modeling the exhaust gas recirculation valve (22).

With this configuration, the opening of the exhaust gas recirculation valve is controlled to the target opening based on the controlled object model which is obtained by modeling the exhaust gas recirculation valve. By performing the control based on the controlled object model, it is possible to improve performance that the opening of the exhaust gas recirculation valve follows up the target opening, and obtain good controllability even in the small opening region, compared with the conventional technique such as a PID (Proportional, Integral, and Differential) control that does not use any controlled object model.

Preferably, a control characteristic of the exhaust gas recirculation valve (22) has a non-operative region (RDEAD) where the opening (LACT) of the exhaust gas recirculation valve does not change when a control input (USLE) to the exhaust gas recirculation valve changes, and the controlled object model is modeled with respect to an operative region (REFCT) which is obtained by excluding the non-operative region.

With this configuration, the controlled object model is modeled with respect to the operative region which is obtained by excluding the non-operative region where the opening does not change when the control input changes. Accordingly, degradation of controllability in the small opening region, which is caused if the controlled object model is modeled including the non-operative region, can be avoided to thereby obtain good controllability over the entire operative region of the exhaust gas recirculation valve.

Preferably, the control apparatus further includes identifying means (42, 43) for identifying at least one model parameter (θ) of the controlled object model, and the control means (41) performs the control, using the at least one model parameter (θ) identified by the identifying means (42, 43).

With this configuration, since the control is performed using the at lease one model parameter identified by the identifying means, good controllability can be maintained even when the dynamic characteristic of the exhaust gas recirculation valve changes due to aging or environmental conditions.

Preferably, the control means (41) controls the exhaust gas recirculation valve (22) with a sliding mode control.

With this configuration, the exhaust gas recirculation valve can be controlled with the sliding mode control which has high robustness. Accordingly, it is possible to improve controllability of the exhaust gas recirculation valve opening to the target opening as well as to realize a stabilized control, even in the presence of a modeling error (a difference between the characteristics of the actual exhaust gas recirculation valve and the characteristics of the controlled object model).

Preferably, the control input (USLE) from the control means (41) to the exhaust gas recirculation valve (22) includes an adaptive law control input (Uadp).

With this configuration, since the control input to the exhaust gas recirculation valve includes the adaptive law control input, good controllability can be obtained even in the presence of disturbance or the modeling error.

Preferably, the control apparatus further includes intake pressure detecting means (7) for detecting an intake pressure (PBA) of the engine, and the control means (41) controls the exhaust gas recirculation valve (22), using a switching function (σ) defined as a linear function of a deviation (e) between the opening (LACT) of the exhaust gas recirculation valve (22) and the target opening (LCMD), and changes the switching function (σ) according to the detected intake pressure (PBA).

Since a pressure difference between the intake pressure and the exhaust pressure acts on a valve body of the exhaust gas recirculation valve, the operating characteristic of the exhaust gas recirculation valve changes due to a change in the intake pressure. This makes the controllability of the exhaust gas recirculation valve change. Therefore, by controlling the exhaust gas recirculation valve using the switching function defined as a linear function of the deviation between the opening of the exhaust gas recirculation valve and the target opening, and changing the switching function according to the detected intake pressure, good controllability can be maintained irrespective of changes in the intake pressure.

DETAILED DESCRIPTION OF THE PREFERRED EMBODIMENTS

Embodiments of the present invention will be hereinafter described with reference to the drawings.

Figure 1:
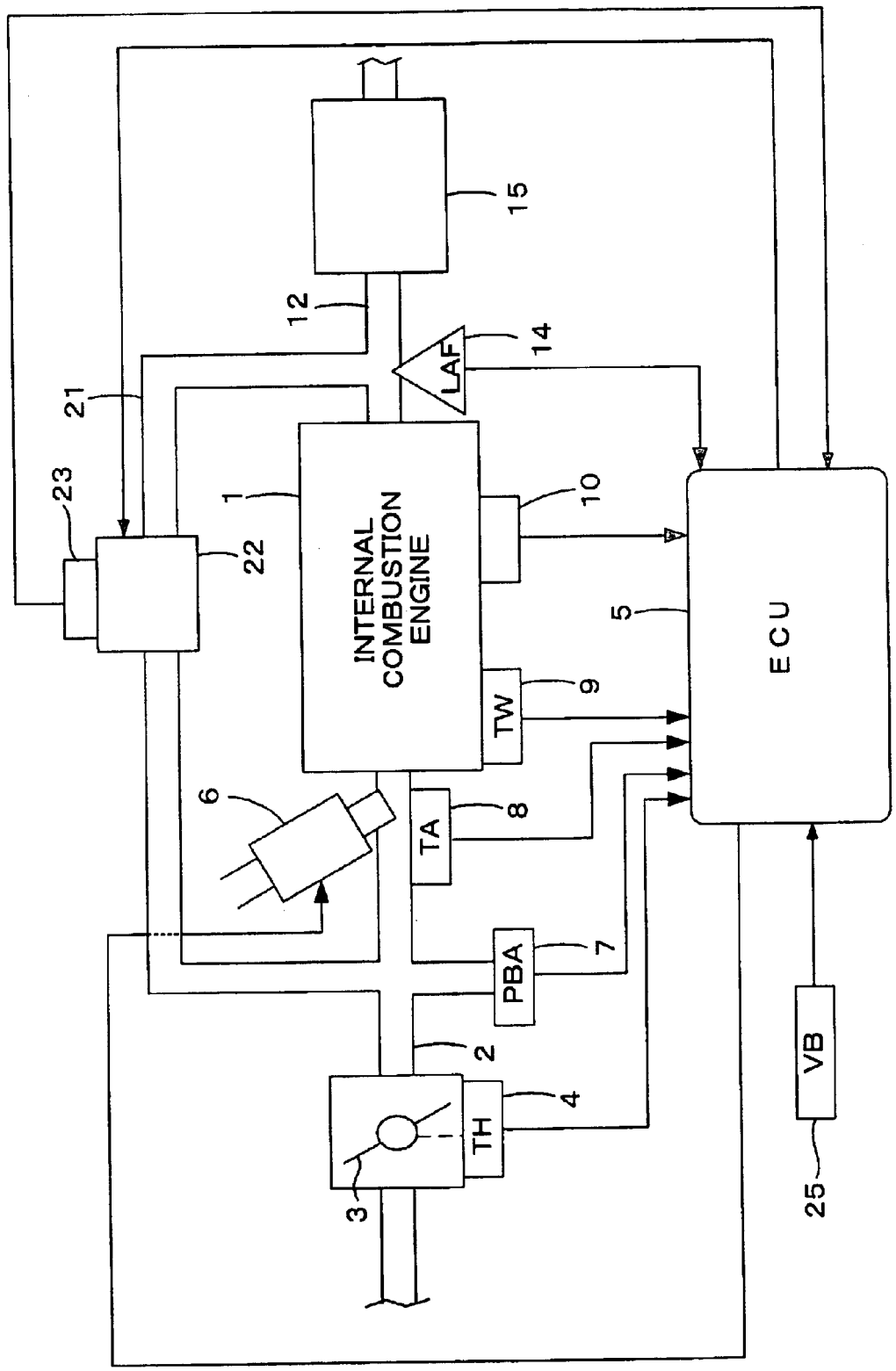
FIG. 1 is a schematic view of an internal combustion engine and the control system therefore according to one embodiment of the present invention.

FIG. 1 schematically shows a configuration of an internal combustion engine (which will be hereinafter referred to as "engine") and a control system therefor according to an embodiment of the present invention. The engine illustrated represents a four-cylinder engine 1, for example, and it has an intake pipe 2 provided with a throttle valve 3. A throttle opening (TH) sensor 4 is connected to the throttle valve 3, so as to output an electrical signal corresponding to an opening angle of the throttle valve 3 and supply the electrical signal to an electronic control unit (which will be hereinafter referred to as "ECU") 5.

Fuel injection valves 6, only one of which is shown, may be inserted into the intake pipe 2 at locations intermediate between the cylinder block of the engine 1 (i.e., slightly upstream of the respective intake valves (not shown)) and the throttle valve 3. The fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 7 is provided immediately downstream of the throttle valve 3. An absolute pressure signal converted to an electrical signal by the absolute intake pressure sensor 7 is supplied to the ECU 5. An intake air temperature (TA) sensor 8 is provided downstream of the absolute intake pressure sensor 7 to detect an intake air temperature TA. An electrical signal corresponding to the detected intake air temperature TA is output from the sensor 8 and supplied to the ECU 5.

An engine coolant temperature (TW) sensor 9 such as a thermistor is mounted on the body of the engine 1 to detect an engine coolant temperature (cooling water temperature) TW. A temperature signal corresponding to the detected engine coolant temperature TW is output from the sensor 9 and supplied to the ECU 5.

A crank angle position sensor 10 for detecting a rotational angle of a crankshaft (not shown) of the engine 1 is connected to the ECU 5, and a signal corresponding to the detected rotational angle of the crankshaft is supplied to the ECU 5. The crank angle position sensor 10 consists of a cylinder discrimination sensor, a TDC sensor, and a CRK sensor. The cylinder discrimination sensor outputs a pulse at a predetermined crank angle position for a specific cylinder of the engine 1 (this pulse will be hereinafter referred to as "CYL pulse"). The TDC sensor outputs a TDC pulse at a crank angle position before a top dead center (TDC) of a predetermined crank angle starting at an intake stroke in each cylinder (at every 180 deg crank angle in the case of a four-cylinder engine). The CRK sensor generates one pulse with a constant crank angle period (e.g., a period of 30 deg) shorter than the period of generation of the TDC pulse (this pulse will be hereinafter referred to as "CRK pulse"). The CYL pulse, the TDC pulse, and the CRK signal pulse are supplied to the ECU 5. These pulses are used to control the various timings, such as fuel injection timing and ignition timing, and for detection of an engine rotational speed NE.

An exhaust pipe 12 of the engine 1 is provided with a three-way catalyst 15 for reducing HC, CO, and NOx. A proportional type air-fuel ratio sensor (which will be hereinafter referred to as "LAF sensor") 14 is mounted on the exhaust pipe 12 at a position upstream of the three-way catalyst 15. The LAF sensor 14 outputs an electrical signal substantially proportional to the oxygen concentration (air-fuel ratio) in the exhaust gases, and supplies the electrical signal to the ECU 5.

An exhaust gas recirculation passage 21 is connected between a portion of the intake pipe 2 downstream of the throttle valve 3 and a portion of the exhaust pipe 12 upstream of the three-way catalyst 15. The exhaust gas recirculation passage 21 is provided with an exhaust gas recirculation valve (which will be hereinafter referred to as "EGR valve") 22 for controlling an exhaust gas recirculation amount. The EGR valve 22 is an electromagnetic valve having a solenoid, and its valve opening degree is controlled by the ECU 5. The EGR valve 22 is provided with a lift sensor 23 for detecting a lift amount (an opening) LACT of the EGR valve 22, and a detection signal from the lift sensor 23 is supplied to the ECU 5. The exhaust gas recirculation passage 21 and the EGR valve 22 constitute an exhaust gas recirculation mechanism.

A battery voltage sensor 25, for detecting an output voltage of a battery which supplies electric power to the solenoid of the EGR valve 22, is connected to the ECU 5, and the detection signal is supplied to the ECU5.

The ECU 5 includes an input circuit, a central processing unit (hereinafter, referred to as "CPU"), a memory circuit, and an output circuit. The input circuit has various functions, for example, a function of shaping waveforms of input signals from the various sensors, a function of correcting voltage levels of input signals to predetermined levels, and a function of converting analog signal values into digital signal values. The memory circuit previously stores various operating programs to be executed by the CPU and also stores results of computation or the like executed by the CPU. The output circuit supplies drive signals, for example, to the fuel injection valves 6, the EGR valve 22.

The CPU of the ECU 5 determines various engine operating conditions according to the detection signals of the various sensors mentioned above, and computes a fuel injection period.

The CPU of the ECU 5 can further calculate a lift amount command value LCMD for the EGR valve 22 according to the engine rotational speed NE and the absolute intake pressure PBA, and outputs a drive signal to the EGR valve 22 so that the lift amount LACT detected by the lift sensor 23 coincides with the lift amount command value LCMD. This drive signal is a pulse signal whose duty ratio can be changed.

Figure 2:
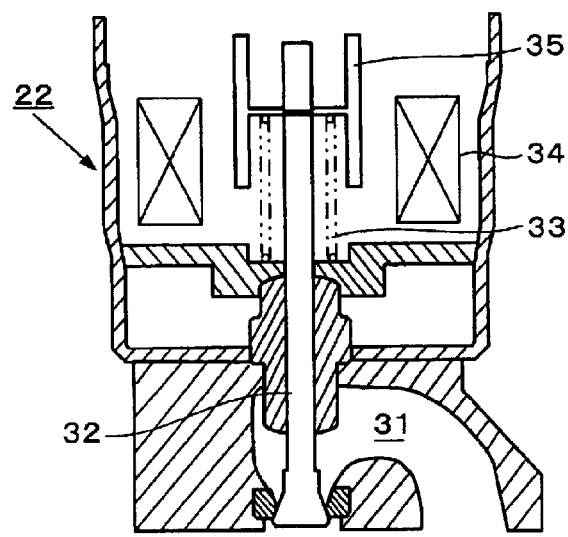
FIG. 2 is a cross sectional view showing a structure of an essential part of an exhaust gas recirculation valve.

FIG. 2 schematically shows one example of a structure of the EGR valve 22. The EGR valve 22 includes a valve body 32 for opening and closing a passage 31, a spring 33 for biasing an armature 35 fixed on the valve body 32 in a closing direction (an upward direction in FIG. 2), and a solenoid 34 for energizing the valve body 32 in an opening direction (a downward direction in FIG. 2). The ECU 5 supplies a drive signal to the solenoid 34. The EGR valve 22 opens by the lift amount LACT which depends on a duty ratio USLE of the drive signal. In this embodiment, the lift amount LACT is detected as a displacement from a fully-closed position to the downward direction.

Figure 3:
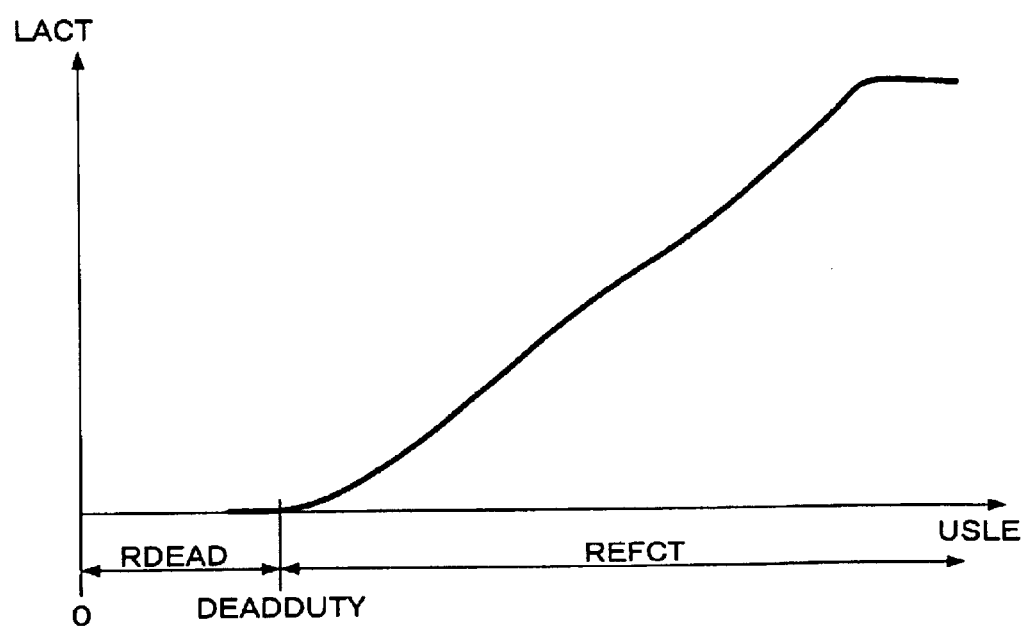
FIG. 3 shows operating characteristics of the exhaust gas recirculation valve.

The valve body 32 stays at the fully-closed position before the energizing force of the solenoid 34 in the opening direction exceeds the biasing force of the spring. Accordingly, the operating characteristic of the EGR valve 22, that is, the relationship between the duty ratio USLE and the lift amount LACT includes, as shown in FIG. 3, a non-operative region RDEAD where the lift amount LACT stays at "0" when the duty ratio USLE changes.

Therefore, in this embodiment, the EGR valve 22 is modeled with respect to an operative region REFCT which is obtained by excluding the non-operative region RDEAD, and the EGR valve 22 is controlled based on a controlled object model which is obtained by modeling the EGR valve 22. As apparent from FIG. 3, in the operative region REFCT, the lift amount LACT is substantially proportional to the duty ratio USLE of the drive signal.

In the present embodiment, the EGR valve 22 is a controlled object. An input to be applied to the controlled object is a duty ratio USLE of the drive signal applied to the EGR valve 22. An output from the controlled object is the lift amount LACT detected by the lift sensor 23.

A model defined by the equation (1) shown below is set as a controlled object model according to frequency response characteristics of the EGR valve 22. It has been confirmed that the frequency response characteristics of the model are similar to the characteristics of the EGR valve 22.

$$LACT(n+1)=a1 \times LACT(n)+a2 \times LACT(n-1)+b1 \times DUT(n-d)+c1 \quad (1)$$

"n" is a parameter representing a discrete sampling time or control time digitized by a predetermined time period $\Delta T$ (e.g., 10 msec), and DUT is a control input to the controlled object model. In the present embodiment, the controlled object model is modeled with respect to the operative region REFCT of the EGR valve 22. Therefore, The duty ratio of the drive signal of the EGR valve 22 is obtained by adding a non-operative duty DEADDUTY shown in FIG. 3 to the control amount DUT. Further, in the present embodiment, the duty ratio USLE supplied to the EGR valve 22 is calculated by performing a voltage correction depending on the battery voltage VB, and a limit process.

In the equation (1), a1, a2, b1, and c1 are model parameters determining the characteristics of the controlled object model, and d is a dead time. The dead time d is a delay time between the input and output of the controlled object model. In order to reduce the calculation load on the CPU, the controlled object model is defined by the following equation (1a) where the dead time d is set to "0", and the modeling error (difference between the characteristics of the controlled object model and the actual characteristics of the controlled object) caused by setting the dead time d to "0" is compensated by robustness of the sliding mode control.

$$LACT(n+1)=a1 \times LACT(n)+a2 \times LACT(n-1)+b1 \times DUT(n)+c1 \quad (1a)$$

In the equation (1a), the model parameter c1, which is irrelevant to the input and output of the controlled object, is employed in addition to the model parameters a1, a2, and b1. The model parameters a1 and a2 are relevant to the lift amount LACT which is an output from the controlled object, and the model parameter b1 is relevant to the control amount DUT corresponding to the input USLE to the controlled object (DUT is a control input which is not subjected to addition of the non-operative duty DEADDUTY, the voltage correction, and the limit process). The model parameter c1 is a parameter indicative of disturbance that acts on the EGR valve 22. In other words, the disturbance acting on the EGR valve 22 can be identified by identifying the model parameter c1 simultaneously with the model parameters a1, a2, and b1 by a model parameter identifier described below.

Figure 4:
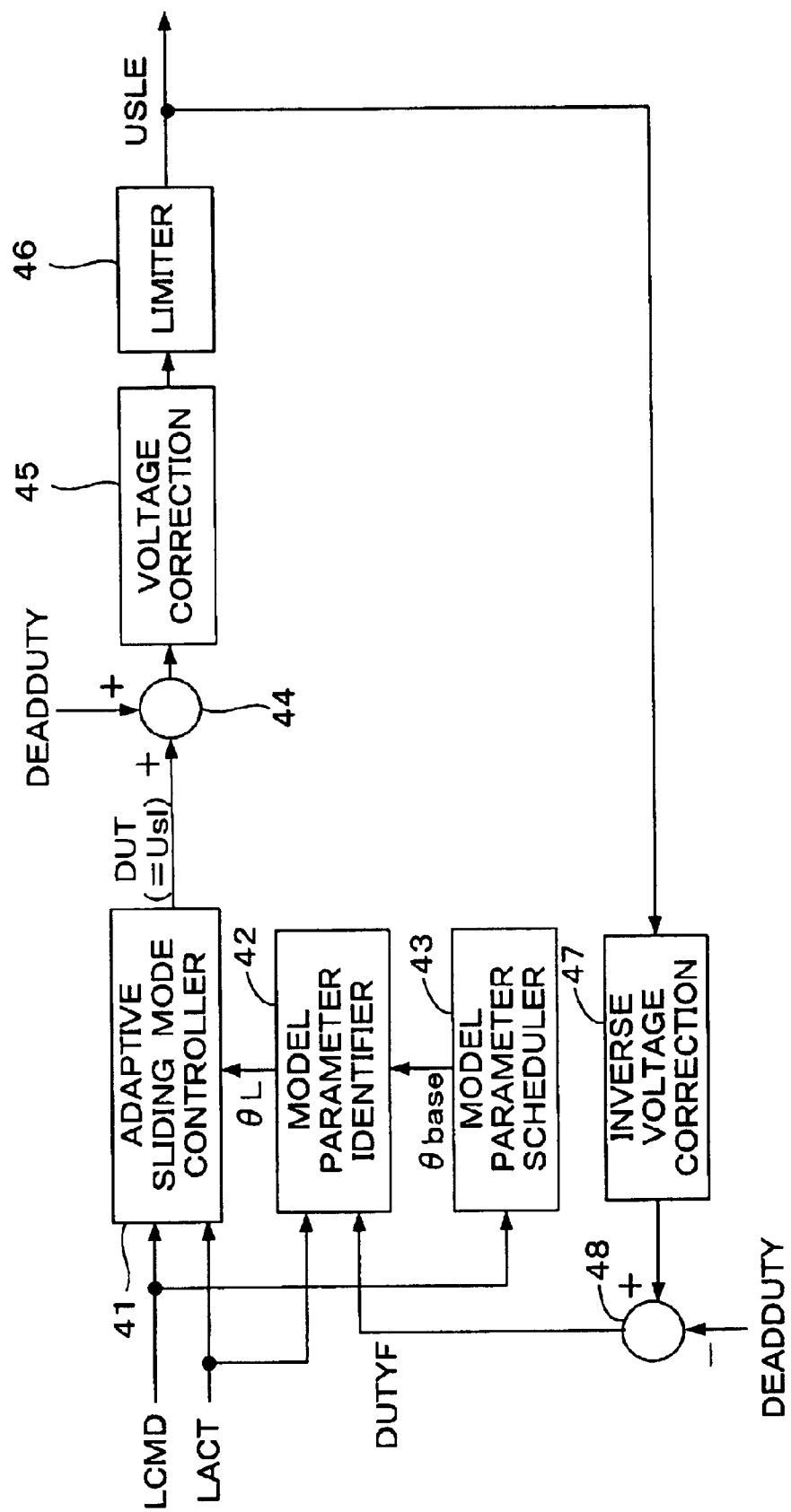
FIG. 4 is a functional block diagram showing functions realized by the electronic control unit (ECU) shown in FIG. 1.

FIG. 4 is a functional block diagram of the control apparatus for the EGR valve 22 which is realized by the ECU 5. This control apparatus includes an adaptive sliding mode controller 41, a model parameter identifier 42, a model parameter scheduler 43, an addition block 44, a voltage correction block 45, a limiter 46, an inverse voltage correction block 47. and a subtraction block 48. The addition block 44 adds the non-operative duty ratio DEADDUTY to the control amount DUT. The voltage correction block 45 corrects the control amount DUT according to the battery voltage VB. The limiter 46 performs a limit process of the voltage-corrected control amount and outputs the duty ratio USLE. The inverse voltage correction block 47 performs an inverse correction of the voltage correction performed by the voltage correction block 45. The subtraction block 48 subtracts the non-operative duty DEADDUTY from the inversely voltage-corrected duty ratio to calculate a feedback control amount DUTYF.

The adaptive sliding mode controller 41 calculates the control amount DUT with an adaptive sliding mode control so that the detected lift amount LACT coincides with the lift amount command value LCMD, and outputs the calculated control amount DUT.

By using the adaptive sliding mode controller 41, it is possible to change (specify) the response characteristics of the lift amount LACT to the lift amount command value LCMD, using a specific parameter (a switching function setting parameter VPOLE described below). In the present embodiment, the switching function setting parameter VPOLE is set according to the absolute intake pressure PBA, to thereby obtain good controllability irrespective of changes in the absolute intake pressure PBA. Further, the sliding mode control can ensure stability of control against error of the model parameters.

The model parameter identifier 42 calculates a corrected model parameter vector θL (θL$^T$=[a1, a2, b1, c1]) and supplies the calculated corrected model parameter vector θL to the adaptive sliding mode controller 41. More specifically, the model parameter identifier 22 calculates a model parameter vector θ based on the lift amount LACT and the feedback control amount DUTYF. The model parameter identifier 22 then carries out a limit process of the model parameter vector θ to calculate the corrected model parameter vector θL, and supplies the corrected model parameter vector θL to the adaptive sliding mode controller 41. In this manner, the model parameters a1, a2, and b1 which are optimum for making the lift amount LACT follow up the lift amount command value LCMD are obtained, and also the model parameter c1 indicative of disturbance is obtained. The limit process of the model parameters is described later.

By using the model parameter identifier 42 for identifying the model parameters on a real-time basis, adaptation to changes in engine operating conditions, compensation for hardware characteristics variations, compensation for power supply voltage fluctuations, and adaptation to aging-dependent changes in hardware characteristics are possible.

The model parameter scheduler 43 calculates a reference model parameter vector θ base (θ base$^T$=[a1base, a2base, b1base, c1base]) according to the lift amount command value LCMD(n) and supplies the calculated reference model parameter vector θ base to the model parameter identifier 42.

The voltage correction block 45 performs a battery voltage correction by multiplying a sum of the control amount DUT and the non-operative duty DEADDUTY by a ratio (VBREF/VB) of the battery voltage VB and a reference voltage VBREF (e.g., 14V). The limiter 46 performs a limit process so that an absolute value of the voltage-corrected control amount falls within a predetermined limit range, to calculate the duty ratio USLE.

The inverse voltage correction block 47 performs an inverse correction of the correction performed by the voltage correction block 45, by multiplying the duty ratio USLE by a reciprocal (VB/VBREF) of the ratio multiplied in the voltage correction block 45. The subtraction block 48 subtracts the non-operative duty DEADDUTY from the inversely voltage-corrected duty ratio to calculate the feedback control amount DUTYF.

Next, principles of operation of the adaptive sliding mode controller 41 will be hereinafter described.

First, if a deviation e(n) between the lift amount LACT and the lift amount command value LCMD is defined by the following equation (4), then a switching function value σ(n) of the adaptive sliding mode controller is set by the following equation (5).

$$e(n)=LACT(n)-LCMD(n) \qquad (4)$$

$$\sigma(n) = e(n) + VPOLE \times e(n-1) \qquad (5)$$
$$= (LACT(n) - LCMD(n)) +$$
$$VPOLE \times (LACT(n-1) \cdot LCMD(n-1))$$

where VPOLE is a switching function setting parameter that is set to a value which is greater than −1 and less than 1.

On a phase plane defined by a vertical axis representing the deviation e(n) and a horizontal axis representing the preceding deviation e(n−1), a pair of the deviation e(n) and the preceding deviation e(n−1) satisfying the equation of "σ(n)=0" represents a straight line. The straight line is generally referred to as a switching straight line. A sliding mode control is a control contemplating the behavior of the deviation e(n) on the switching straight line. The sliding mode control is carried out so that the switching function value σ(n) becomes "0", i.e., the pair of the deviation e(n) and the preceding deviation e(n−1) exists on the switching straight line on the phase plane, to thereby achieve a robust control against disturbance and the modeling error. As a result, the lift amount LACT is controlled with good robustness to follow up the lift amount command value LCMD.

By changing the value of the switching function setting parameter VPOLE in the equation (5), it is possible to change a damping characteristic of the deviation e(n), i.e., the follow-up characteristic of the lift amount LACT to follow up the lift amount command value LCMD. Specifically, if VPOLE equals "−1", then the lift amount LACT completely fails to follow up the lift amount command value LCMD. As the absolute value of the switching function setting parameter VPOLE is reduced, the speed at which the lift amount LACT follows up the lift amount command value LCMD increases. In this way, the sliding mode controller is capable of specifying the damping characteristic of the deviation e(n) as a desired characteristic. Therefore, the sliding mode controller is referred to as a response-specifying type controller.

According to the sliding mode control, the converging speed can easily be changed by changing the switching function setting parameter VPOLE. Therefore, in this embodiment, the switching function setting parameter VPOLE is set according to the absolute intake pressure PBA, to thereby obtain a good response characteristic irrespective of changes in the absolute intake pressure PBA.

As described above, according to the sliding mode control, the deviation e(n) is converged to "0" at a specified converging speed and robustly against disturbance and the modeling error by constraining the pair of the deviation e(n) and the preceding deviation e(n−1) on the switching straight line (the pair of e(n) and e(n−1) will be hereinafter referred to as "deviation state quantity"). Therefore, in the sliding mode control, it is important how to place the deviation state quantity onto the switching straight line and constrain the deviation state quantity on the switching straight line.

From the above standpoint, the input DUT(n) (also indicated as Usl(n)) to the controlled object (an output of the controller) is expressed as a sum of an equivalent control input Ueq(n), a reaching law input Urch(n), an adaptive law input Uadp(n), and a damping input Udamp(n), as indicated by the following equation (6).

$$DUT(n) = Usl(n) \qquad (6)$$
$$= Ueq(n) + Urch(n) + Uadp(n) + Udamp(n)$$

The equivalent control input Ueq(n) is an input for constraining the deviation state quantity on the switching straight line. The reaching law input Urch(n) is an input for placing the deviation state quantity onto the switching straight line. The adaptive law input Uadp(n) is an input for placing the deviation state quantity onto the switching straight line while reducing the modeling error and the influence of disturbance.

The damping input Udamp(n) is an input for preventing an overshoot of the lift amount LACT with respect to the lift amount command value LCMD.

Methods of calculating these inputs Ueq(n), Urch(n), Uadp(n), Udamp(n) will be described below.

Since the equivalent control input Ueq(n) is an input for constraining the deviation state quantity on the switching straight line, a condition to be satisfied is given by the following equation (7).

$$\sigma(n)=\sigma(n+1) \qquad (7)$$

Using the equations (1), (4), and (5), the duty ratio DUT(n) satisfying the equation (7) is determined by the equation (8) shown below. The duty ratio DUT(n) calculated with the equation (8) represents the equivalent control input Ueq(n).

$$DUT(n) = (1/b1)\{(1 - a1 - VPOLE)LACT(n) + \qquad (8)$$
$$(VPOLE - a2)LACT(n-1) - c1 + LCMD(n+1) +$$
$$(VPOLE - 1)LCMD(n) - VPOLE \times LCMD(n-1)\}$$
$$= Ueq(n)$$

Since it is actually difficult to obtain a future value LCMD(n+1) of the lift amount command value, the equivalent control input Ueq(n) is calculated by the following equation (8a) from which the term relative to the lift amount command value LCMD is removed.

$$Ueq(n)=(1/b1)\{(1-a1-VPOLE)LACT(n) +(VPOLE-a2)LACT(n-1)-c1\} \qquad (8a)$$

The reaching law input Urch(n) and the adaptive law input Uadp(n) are calculated respectively with equations (9) and (10) shown below.

$$Urch(n) = \frac{-F}{b1}\sigma(n) \qquad (9)$$

$$Uadp(n) = \frac{-G}{b1}\sum_{i=0}^{n}\Delta T\sigma(i) \qquad (10)$$

where F and G respectively represent a reaching law control gain and an adaptive law control gain, which are set so that the deviation state quantity is stably placed onto the switching straight line.

The damping input Udamp(n) is calculated with the equation (13) shown below.

$$Udamp=-KDAMP(LACT(n)-LACT(n-1))/b1 \qquad (13)$$

where KDAMP is a damping control gain which is set to a optimum value by experiments.

As described above, the equivalent control input Ueq(n), the reaching law input Urch(n), the adaptive law input Uadp(n), and the damping input Udamp(n) are calculated, and the control amount DUT is calculated as a sum of these inputs.

Next, principles of operation of the model parameter identifier 42 will be hereinafter described.

The model parameter identifier 42 calculates a model parameter vector of the controlled object model, based on the feedback control amount DUTYF and the output (LACT(n)) of the controlled object, as described above. The feedback control amount DUTYF is obtained by performing the inverse voltage correction of the input USLE to the controlled object and subtracting the non-operative duty DEADDUTY, Specifically, the model parameter identifier 42 calculates a model parameter vector θ(n) according to a sequential identifying algorithm (generalized sequential method-of-least-squares algorithm) represented by the following equation (16).

$$\theta(n)=\theta(n-1)+KP(n)ide(n) \qquad (16)$$

$$\theta(n)^T=[a1', a2', b1', c1'] \qquad (17)$$

where a1', a2', b1', and c1' represent model parameters before a limit process described later is carried out, ide(n) represents an identifying error defined by the equations (18), (19), and (20) shown below, where LACTHAT(n) represents an estimated value of the lift amount LACT(n) (hereinafter referred to as "estimated lift amount") which is calculated using the latest model parameter vector θ(n-1), and KP(n) represents a gain coefficient vector defined by the equation (21) shown below. In the equation (21), P(n) represents a quartic square matrix calculated from the equation (22) shown below.

$$ide(n)=LACT(n)-LACTHAT(n) \qquad (18)$$

$$LACTHAT(n)=\theta(n-1)^T\zeta(n) \qquad (19)$$

$$\zeta(n)^T=[LACT(n-1), LACT(n-2), DUTYF(n-1), 1] \qquad (20)$$

$$KP(n) = \frac{P(n)\zeta(n)}{1 + \zeta^T(n)P(n)\zeta(n)} \qquad (21)$$

$$P(n+1) = \frac{1}{\lambda_1}\left(E - \frac{\lambda_2 P(n)\zeta(n)\zeta^T(n)}{\lambda_1 + \lambda_2\zeta^T(n)P(n)\zeta(n)}\right)P(n) \qquad (22)$$

(E is an unit matrix)

As shown in the equation (20), the model parameter vector θ is identified using the feedback control amount DUTYF instead of the control amount DUT in this embodiment.

In accordance with the setting of coefficients λ1 and λ2 in the equation (22), the identifying algorithm from the equations (16) through (22) corresponds to one of the following four identifying algorithm:

| | |
|---|---|
| λ1 = 1, λ2 = 0 | Fixed gain algorithm |
| λ1 = 1, λ2 = 1 | Method-of-least-squares algorithm |
| λ1 = 1, λ2 = λ | Degressive gain algorithm (λ is a given value other than 0, 1) |
| λ1 = λ, λ2 = 1 | Weighted Method-of-least-squares algorithm (λ is a given value other than 0, 1) |

If the fixed gain algorithm is used to reduce the amount of calculations, then the equation (21) is simplified into the following equation (21a) where P represents a square matrix with constants as diagonal elements.

$$KP(n) = \frac{P\zeta(n)}{1 + \zeta^T(n)P\zeta(n)} \tag{21a}$$

There are situations where model parameters calculated from the equations (16) through (20), and (21a) gradually shifts from desired values. Specifically, if a residual identifying error caused by nonlinear characteristics such as friction characteristics of the EGR valve exists after the model parameters have been converged to a certain extent, or if a disturbance whose average value is not zero is steadily applied, then the residual identifying errors are accumulated, causing a drift in the model parameter. To prevent such a drift of the model parameters, the model parameter vector θ (n) is calculated by the following equation (16a) instead of the equation (16).

$$\theta(n) = \theta(0) + DELTA^{n-1} \times KP(1)ide(1) + \tag{16a}$$
$$DELTA^{n-2} \times KP(2)ide(2) + \ldots +$$
$$DELTA \times KP(n-1)ide(n-1) + KP(n)ide(n)$$

where DELTA represents a forgetting coefficient matrix in which the forgetting coefficient δ i (i=1 through 3) and "1" are diagonal elements and other elements are all "0", as shown by the following equation (23).

$$DELTA = \begin{bmatrix} \delta 1 & 0 & 0 & 0 \\ 0 & \delta 2 & 0 & 0 \\ 0 & 0 & \delta 3 & 0 \\ 0 & 0 & 0 & 1 \end{bmatrix} \tag{23}$$

The forgetting coefficient δ i is set to a value between "0" and "1" (0<δ i<1) and has a function to gradually reduce the effect of past identifying errors. In the equation (23), the coefficient which is relevant to the calculation of the model parameter c1' is set to "1", to thereby hold the effect of past values. By setting one of the diagonal elements of the forgetting coefficient matrix DELTA, i.e., the coefficient which is relevant to the calculation of the model parameter c1', to "1", it is possible to prevent a steady deviation between the lift amount command value LCMD and the lift amount LACT. The model parameters are prevented from drifting by setting other elements δ 1, δ 2, and δ 3 of the forgetting coefficient matrix DELTA to a value which is greater than "0" and less than "1".

When the equation (16a) is rewritten into a recursive form, the following equations (16b) and (16c) are obtained. A process of calculating the model parameter vector θ (k) using the equations (16b) and (16c) rather than the equation (16) is hereinafter referred to as "δ correcting method", and d θ (k) defined by the equation (16c) is referred to as "updating vector".

$$\theta(n) = \theta(0) + d\theta(n) \tag{16b}$$

$$d\theta(n) = DELTA \cdot d\theta(n-1) + KP(n)ide(n) \tag{16c}$$

According to an algorithm using the δ correcting method, a model parameter stabilizing effect as well as the drift preventing effect can be obtained. Specifically, an initial vector θ (0) is maintained at all times, and values which can be taken by the elements of the updating vector d θ (n) are limited by the effect of the forgetting coefficient matrix DELTA. Therefore, the model parameters can be stabilized in the vicinity of their initial values.

Furthermore, since model parameters are calculated while adjusting the updating vector d θ (n) according to the identifying process based on the input and output data of the actual controlled object, it is possible to calculate model parameters that match the actual controlled object.

It is preferable to calculate the model parameter vector θ (n) from the following equation (16) which uses a reference model parameter vector θ base instead of the initial vector θ (0) in the equation (16b).

$$\theta(n) = \theta base + d\theta(n) \tag{16d}$$

The reference model parameter vector θ base is set according to the lift amount command value LCMD by the model parameter scheduler 43. Consequently, the reference model parameter vector θ base can be adapted to changes in the dynamic characteristics which correspond to changes in the lift amount command value LCMD (lift amount LACT).

Further, in the present embodiment, the identifying error ide(n) is subjected to a low-pass filtering. If model parameters are identified by the model parameter identifier 42 with respect to a controlled object which has low-pass characteristics (characteristics of attenuating high-frequency components), the identified model parameters are largely affected by the high-frequency-rejection characteristics, so that the gain of the controlled object model becomes lower than actual characteristics in a low-frequency range. As a result, the sliding mode controller 41 excessively corrects the control input.

Therefore, according to the low-pass filtering, the frequency characteristics of the controlled object model is made to coincide with the actual frequency characteristics, or the low frequency gain of the controlled object model is corrected to a level which is slightly higher than the actual gain. This makes it possible to prevent the control input from being excessively corrected by the sliding mode controller 41, to thereby improve robustness of the control system and further stabilize the control system.

The low-pass filtering is carried out by storing past values ide(n−i) of the identifying error (e.g., 10 past values for i=1 through 10) in a ring buffer, multiplying the past values by weighting coefficients, and adding the products of the past values and the weighting coefficients.

When the identifying error which has been subjected to the low-pass filtering is represented by idef(n) as shown in the following equation (30), then the updating vector d θ (n) is calculated from the following equation (16e) instead of the equation (16c).

$$Idef(n) = LF(ide(n)) \tag{30}$$

$$d\theta(n) = DELTA \times d\theta(n-1) + KP(n)idef(n) \tag{16e}$$

Elements a1', a2', b1', and c1' of the model parameter vector θ (n) calculated from the equation (16d) are subjected to a limit process described below in order to improve robustness of the control system.

In the preceding embodiment, the preceding updating vector $d\theta(n-1)$ calculated from the equation (33) shown below is used as the preceding updating vector $d\theta(n-1)$ to be applied to the equation (16e). Further, the limited model parameter vector $\theta L(n-1)$ is used for calculating the estimated lift amount LACTHAT as shown in the following equation (19a).

$$d\theta(n-1)=\theta L(n-1)-\theta \text{base}(n-1) \quad (33)$$

$$LACTHAT=\theta L(n-1)^T \zeta(n) \quad (19a)$$

The model parameter vector after being subjected to the limit process is expressed by the following equations (38) and (39).

$$\theta L(n)=LMT(\theta(n)) \quad (38)$$

$$\theta L(n)^T=[a1, a2, b1, c1] \quad (39)$$

In the present embodiment, as described above, the EGR valve 22 is controlled based on the controlled object model which is obtained by modeling the EGR valve 22 with respect to the operative region REFCT. This is based on the following reason.

If a controlled object model which is obtained by modeling the EGR valve 22 including the non-operative region RDEAD is employed, an identified value of the model parameter b1 becomes smaller in the low lift amount region, and hence the equivalent control input Ueq and the reaching law input Urch change with high gains, since the non-operative duty DEADDUTY is relatively large (e.g., about 15%). Accordingly, there occurs a problem that the valve body of the EGR valve 22 may possibly collide with the valve seat when controlling the EGR valve 22 in the closing direction. Further, the following problem also occurs: the model parameters a1 and a2 continuously stay at the limit value, and the model parameter c1 increases for reducing the identifying error, so that it becomes difficult to set the reference model parameter vector θ base by the model parameter scheduler 43, or the response characteristic (controllability) of the lift amount LACT to the lift amount command value LCMD is degraded due to increase of the model parameter c1.

Therefore, in the present embodiment, the controlled object model which is obtained by modeling the EGR valve 22 with respect to the operative region REFCT, is employed. In other words, the configuration wherein the duty ratio USLE of the actuation signal of the EGR valve 22 is calculated by adding the non-operative duty DEADDUTY to the output (Usl) of the adaptive sliding mode controller 41, and the feedback control amount DUTYF, which is obtained by subtracting the non-operative duty DEADDUTY from the duty ratio USLE, is input to the model parameter identifier 42, is employed. This configuration makes it possible to solve the above problems and obtain good controllability in the low lift amount region.

Next, operation processes executed by the CPU in the ECU 5 for realizing the functions of the adaptive sliding mode controller 41, the model parameter identifier 42, the model parameter scheduler 43, the addition block 44, the voltage correction block 45, the limiter 46, the inverse voltage correction block 47, and the subtraction block 48 will be described below.

Figure 5:
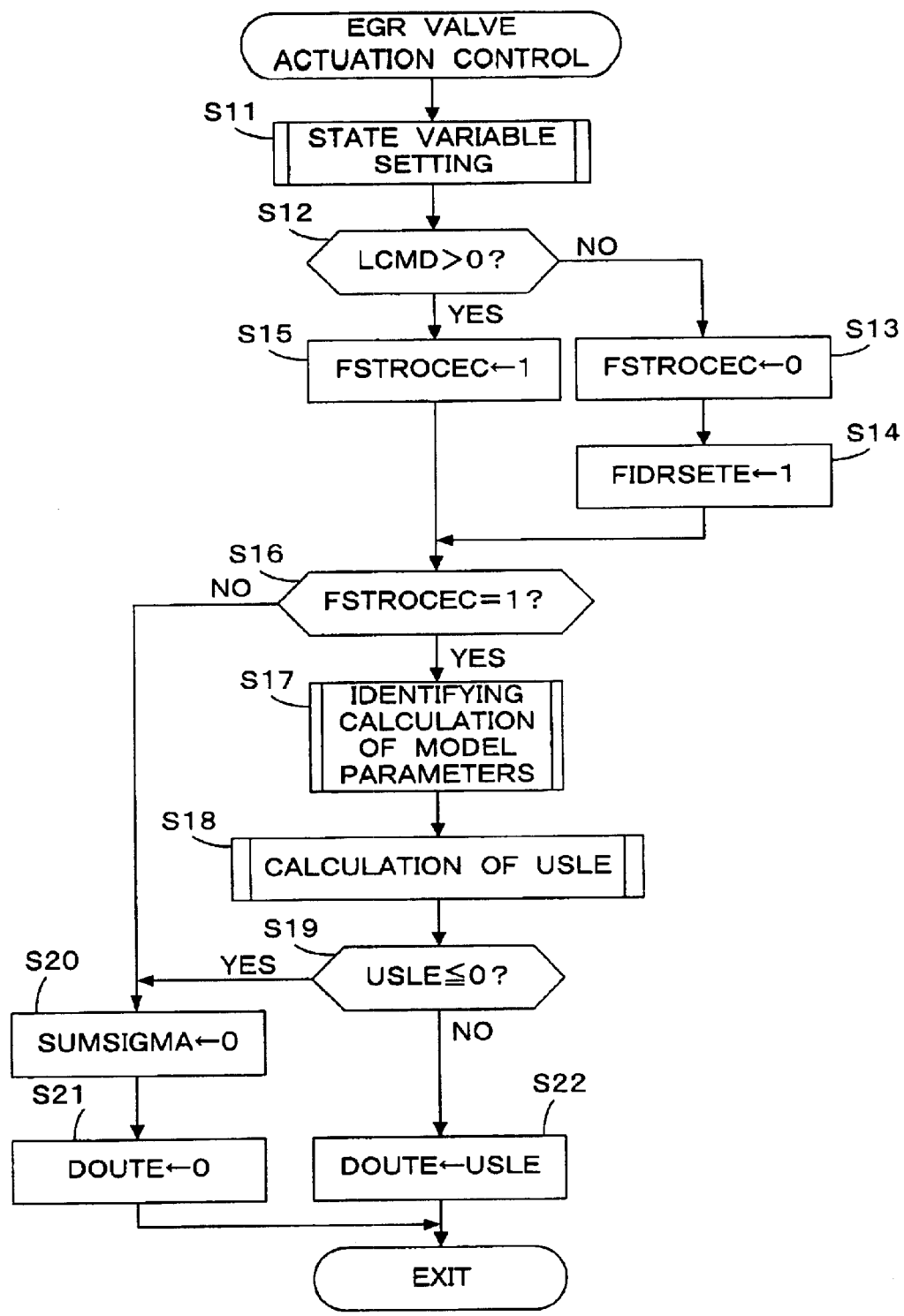
FIG. 5 is a flowchart showing a process of an actuation control of the exhaust gas recirculation valve.

FIG. 5 is a flowchart showing a process of the actuation control of the EGR valve 22. The process is executed by the CPU in the ECU 5 at intervals of a predetermined period (e.g., 10 msec).

Figure 6:
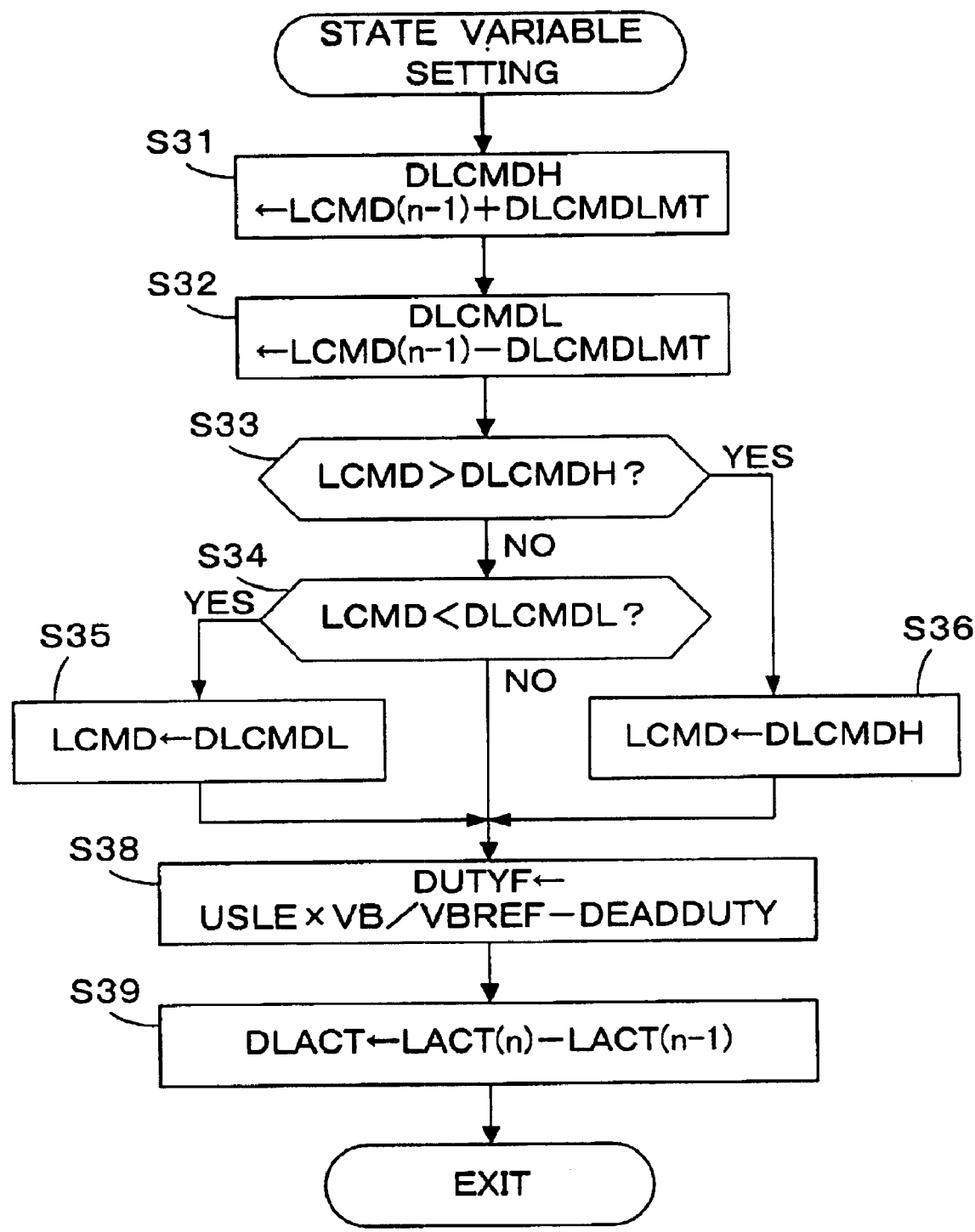
FIG. 6 is a flowchart showing a process of setting state variables, executed in the process shown in FIG. 5.

In step S11, a process of setting a state variable shown in FIG. 6 is performed. In this process, a limit process of the lift amount command value LCMD, a calculation of the feedback control amount DEADDUTY from the duty ratio USLE (corresponding to calculations executed by the inverse voltage correction block 47 and the subtraction block 48 shown in FIG. 4), and the like are executed. The lift amount command value LCMD is set according to the engine operating condition in the process which is not shown.

In step S12, it is determined whether or not the lift amount command value LCMD is greater than "0". If LCMD is greater than "0", an execution permission flag FSTROCEC is set to "1" (step S15), and the program proceeds to step S16. If LCMD is equal to "0", the execution permission flag FSTROCEC is set to "0" (step S13), and an initialization flag FIDRSETE is set to "1" (step S14). When the initialization flag FIDRSETE is set to "1", a counter CNTIDSTE described later is initialized (see FIG. 7, steps S42 and S43).

In step S16, it is determined whether or not the execution permission flag FSTROCEC is "1". If FSTROCEC is equal to "0", an accumulated value SUMSIGMA of the switching function value a is set to "0" (step S20), and an output duty DOUTE is set to "0" (step S21). The duty ratio of the actuation signal supplied to the EGR valve 22 is set to the output duty DOUTE.

Figure 7:
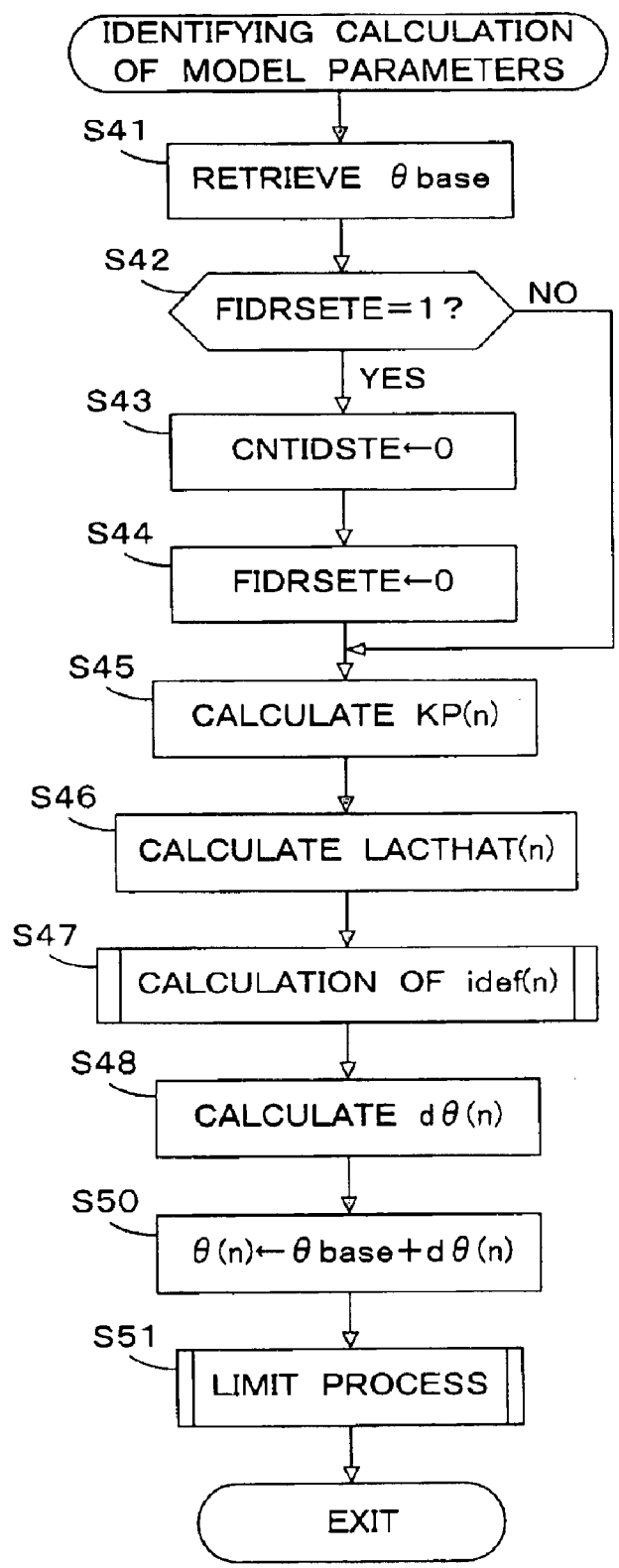
FIG. 7 is a flowchart showing a process of identifying calculation of the model parameters, executed in the process shown in FIG. 5.
Figure 15:
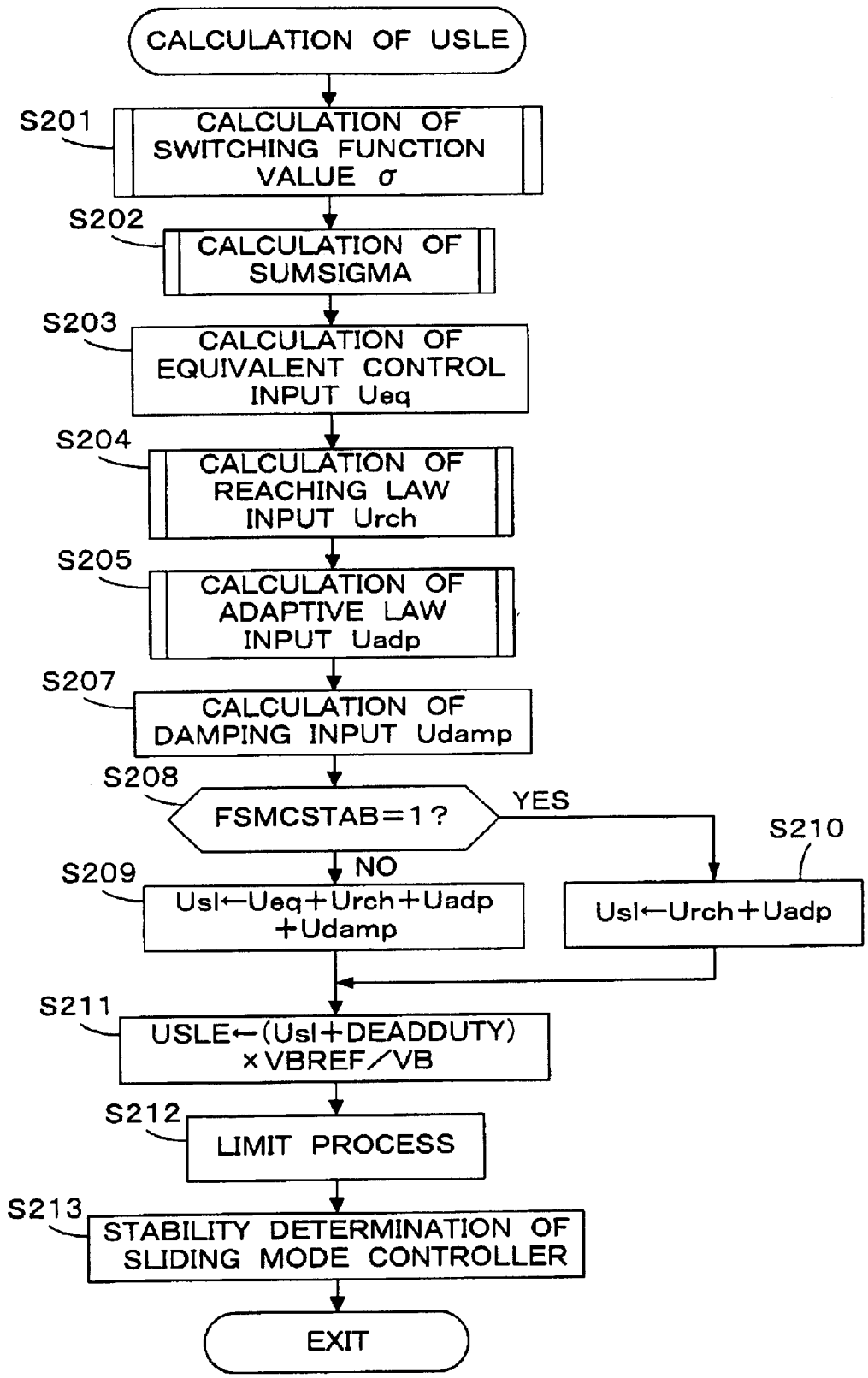
FIG. 15 is a flowchart showing a process of calculating a duty ratio (USLE) executed in the process shown in FIG. 5.

If FSTROCEC is equal to "1" in step S16, the identifying calculation process of the model parameters shown in FIG. 7 is executed to calculate the model parameter vector θ (step S17). In step S18, a USLE calculation process shown in FIG. 15 is executed to calculate the duty ratio USLE. Next, it is determined whether or not the duty ratio USLE is less than or equal to "0" (step S19). If USLE is less than or equal to "0", the program proceeds to step S20. If USLE is greater than "0", the output duty ratio DOUTE is set to the duty ratio USLE (step S22).

FIG. 6 is a flowchart showing the state variable setting process executed in step S11 of FIG. 5.

In step S31, an upper limit command value DLCMDH is calculated by adding a predetermined change amount DLCMDLMT to a preceding value LCMD(n-1) of the lift amount command value. Next, a lower limit command value DLCMDL is calculated by subtracting the predetermined change amount DLCMDLMT from the preceding value LCMD(n-1) of the lift amount command value (step S32). In step S33, it is determined whether or not the lift amount command value LCMD is greater than the upper limit command value DLCMDH. If LCMD is greater than DLCMDH, the lift amount command value LCMD is set to the upper limit command value DLCMDH (step S36).

If LCMD is less than or equal to DLCMDH in step S33, it is further determined whether or not the lift amount command value LCMD is less than the lower limit command value DLCMDL (step S34). If LCMD is less than DLCMDL, the lift amount command value LCMD is set to the lower limit command value DLCMDL (step S35). If the answer to step S34 is negative (NO), the program directly proceeds to step S38.

In step S38, the duty ratio USLE, the battery voltage VB, the reference voltage VBREF, and the non-operative duty DEADDUTY are applied to the following equation (41), to calculate the feedback control amount DUTYF.

$$DUTYF=USLE \times VB/VBREF-DEADDUTY \quad (41)$$

In step S39, a lift-amount change amount DLACT is calculated from the following equation (42).

$$DLACT=LACT(n)-LACT(n-1) \quad (42)$$

FIG. 7 is a flowchart showing the identifying calculation process of the model parameters, which is executed in step S17 of FIG. 5.

Figure 8:
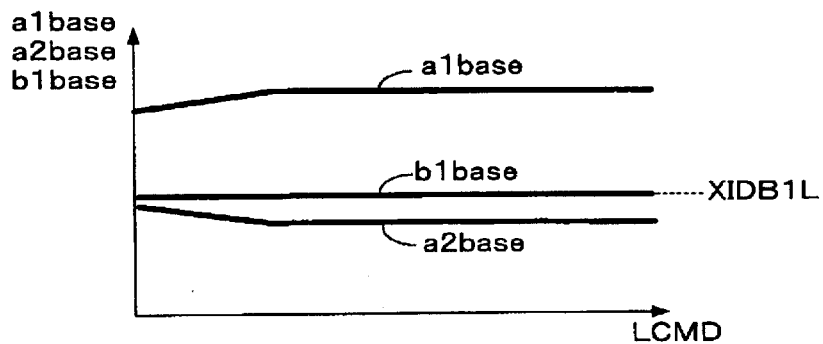
FIG. 8 is a diagram showing a table used in the process shown in FIG. 7.

In step S41, θ base table shown in FIG. 8 is retrieved according to the lift amount command value LCMD, to calculate the reference model parameter vector θ base. Actually, in the θ base table, the reference model parameters a1base and a2base are set according to the lift amount command value, and the reference model parameter b1base is set to a minimum value XIDB1L. Further, the reference model parameter c1base is set to "0".

In step S42, it is determined whether or not the initialization flag FIDRSETE is "1". If FIDRSETE is equal to "1", a value of a counter CNTIDSTE is set to "0" (step S43), and the initialization flag FIDRSETE is returned to "0" (step S44). Thereafter, the program proceeds to step S45. The counter CNTIDSTE is incremented and referred to in the process of FIG. 9. After execution of step S44, the program directly proceeds from step S42 to step S45.

In step S45, the gain coefficient vector KP(n) is calculated by the equation (21a). Next, the estimated lift amount LACTHAT is calculated by the equation (19a) (step S46).

Figure 10:
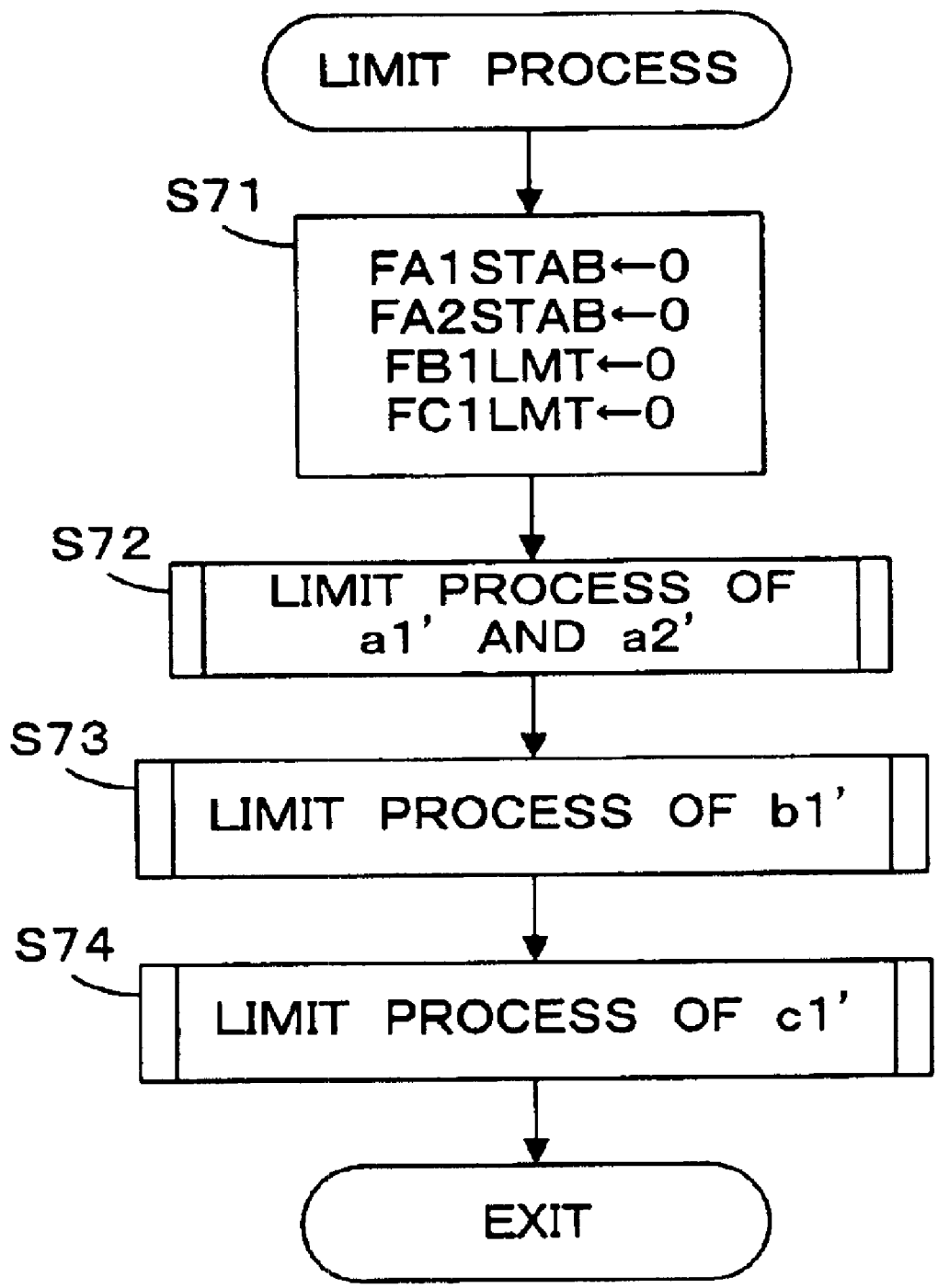
FIG. 10 is a flowchart showing a limit process executed in the process shown in FIG. 7.

In step S47, a calculation process of idef(n) shown in FIG. 8 is executed to calculate a filtered identifying error idef(n). In step S48, the updating vector d θ (n) is calculated by the equations (16e) and (33). In step S50, the model parameter vector θ (n) is calculated by the equation (16d). In step S51, a limit process shown in FIG. 10 is executed. Thereafter, this process ends.

Figure 9:
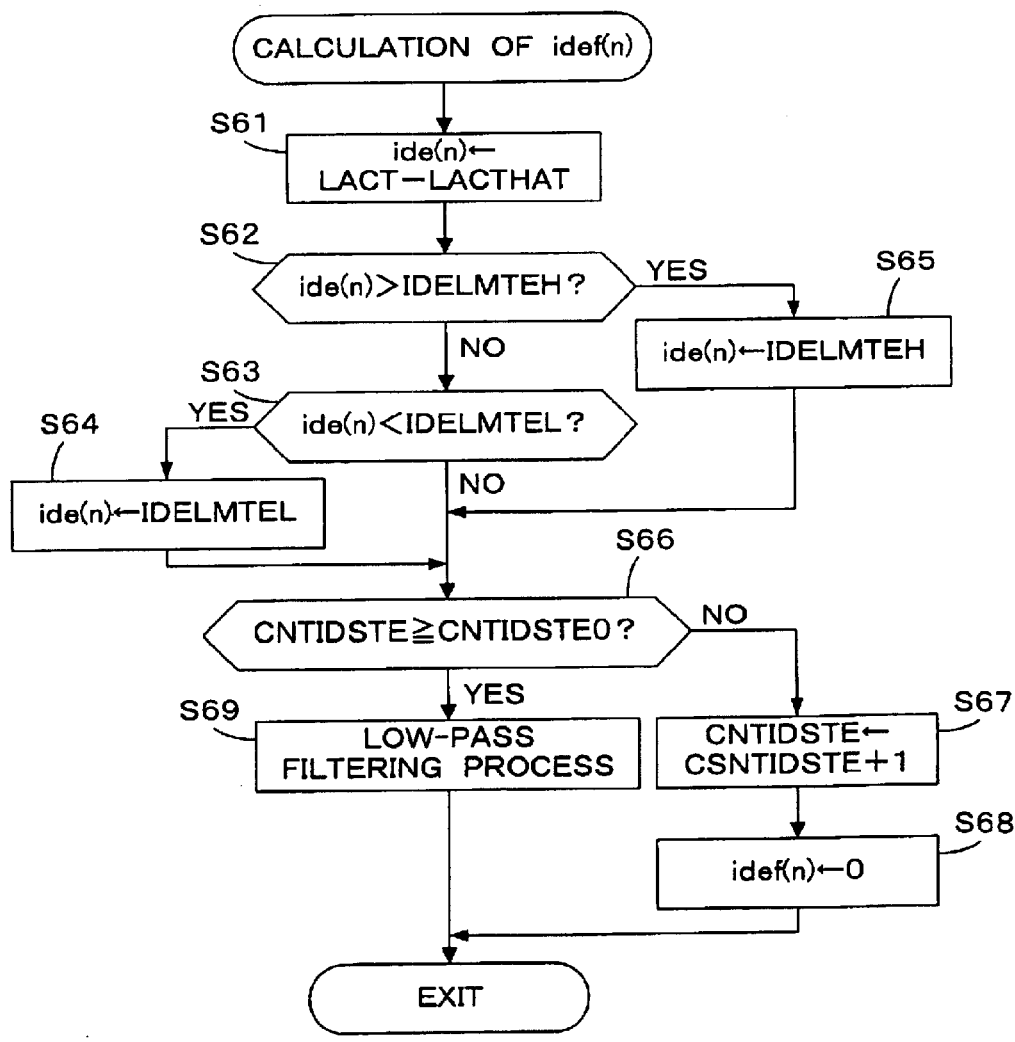
FIG. 9 is a flowchart showing a process of calculating an identifying error (ide) in the process shown in FIG. 7.

FIG. 9 is a flowchart showing a process of calculating the identifying error idenf(n) which is carried out in step S47 shown in FIG. 7.

In step S61, the identifying error ide(n) is calculated from the equation (18). Next, it is determined whether or not the calculated identifying error ide(n) is greater than a upper limit value IDELMTEH (step S62). If ide(n) is greater than IDELMTEH, the identifying error ide(n) is set to the upper limit value IDELMTEH (step S65).

If ide(n) is less than or equal to IDELMTEH in step S62, it is determined whether or not the identifying error ide(n) is less than a lower limit value IDELMTEL (step S63). If ide(n) is less than the lower limit value IDELMTEL, the identifying error ide(n) is set to the lower limit value IDELMTEL (step S64). If the answer to step S63 is negative (NO), the program directly proceeds to step S66.

In step S66, it is determined whether or not a value of the counter CNTIDSTE is greater than or equal to a predetermined count value CNTIDSTE0 (e.g., "2"). At first, CNTIDSTE is less than CNTIDSTE0. Accordingly, the counter CNTIDSTE is incremented by "1" (step S67), and the identifying error idef(n) is set to "0" (step S68). Immediately after the identification of the model parameter vector θ (n) starts, no correct identifying error is obtained by the calculation of the equation (18). Therefore, the identifying error idef(n) is set to "0" by steps S66 through S68, without using the calculated result of the equation (18).

IF CNTIDSTE is greater than or equal to CNTIDSTE0 in step S66, a low-pass filtering process is executed in step S69 to calculate the identifying error idef(n). Specifically, the low-pass filtering process is executed, for example, by storing a predetermined number N0 of values of the identifying error ide(n) in a ring buffer, and performing a moving-averaging calculation of the stored values of the identifying error ide(n).

FIG. 10 is a flowchart showing a limit process which is carried out in step S51 shown in FIG. 7.

In step S71, flags FA1STAB, FA2STAB, FB1LMT, and FC1LMT used in this process are initialized to be set to "0".

Figure 11:
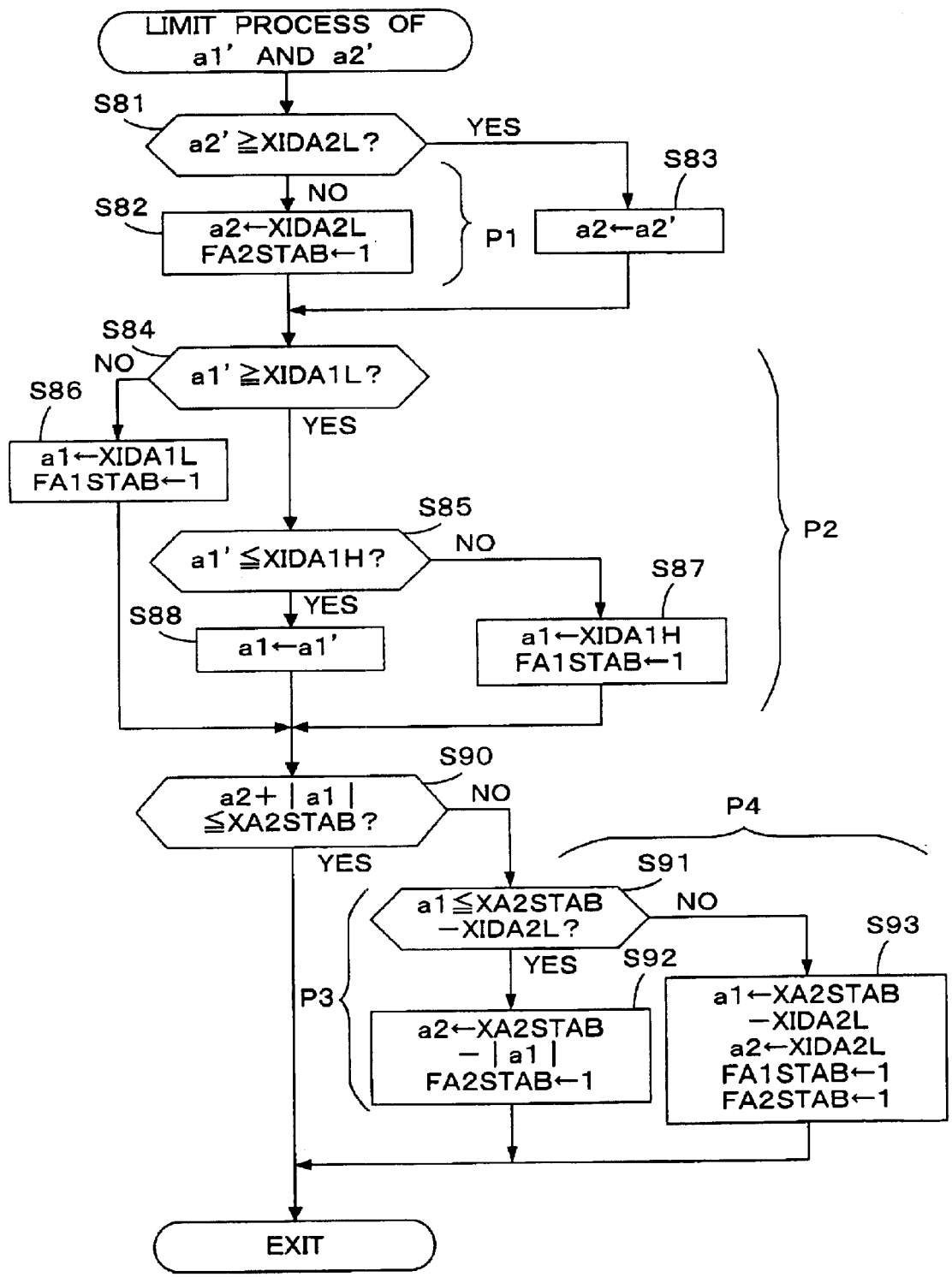
FIG. 11 is a flowchart showing a limit process of model parameters (a1', a2') in the process shown in FIG. 10.
Figure 13:
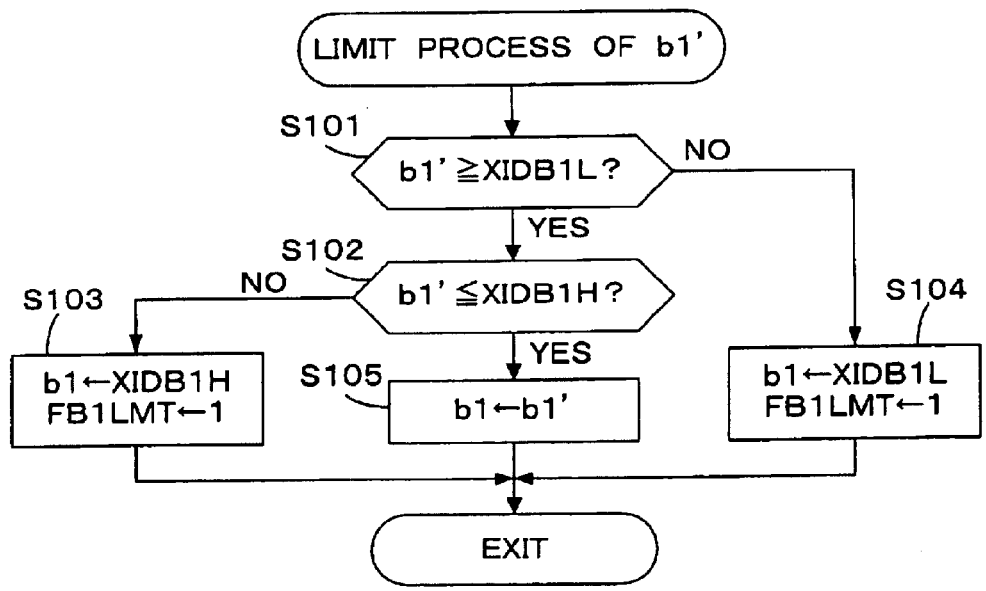
FIG. 13 a flowchart showing a limit process of a model parameter (b1') in the process shown in FIG. 10.
Figure 14:
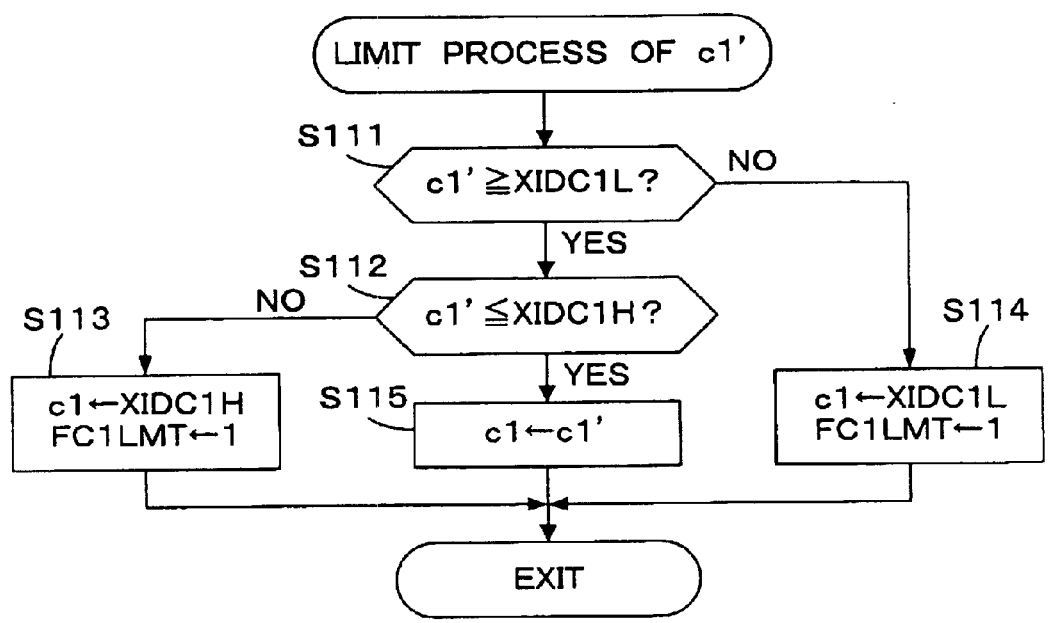
FIG. 14 is a flowchart showing a limit process of a model parameter (c1') in the process shown in FIG. 10.

In step S72, the limit process of the model parameters a1' and a2' shown in FIG. 11 is executed. In step S73, the limit process of the model parameter b1' shown in FIG. 13 is executed. In step S74, the limit process of the model parameter c1' shown in FIG. 14 is executed.

Figure 12:
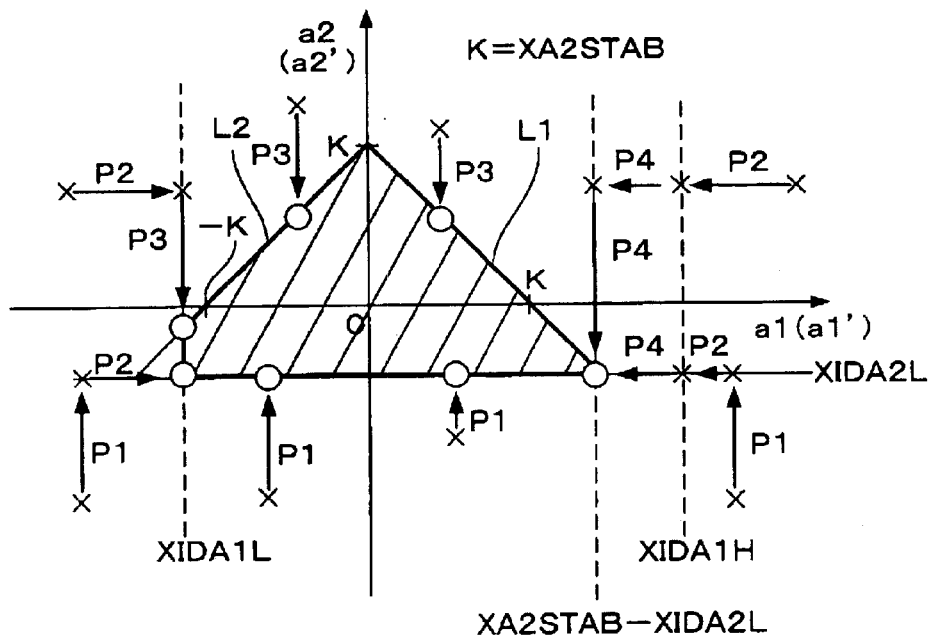
FIG. 12 is a diagram for illustrating the process shown in FIG. 11.

FIG. 11 is a flowchart showing the limit process of the model parameters a1' and a2', which is carried out in the step S72 shown in FIG. 10. FIG. 12 is a diagram illustrative of the process shown in FIG. 11, and will be referred to with FIG. 11.

In FIG. 12, combinations of the model parameters a1' and a2' which are required to be limited are indicated by "x" symbols, and the range of combinations of the model parameters a1' and a2' which are stable are indicated by a hatched region (hereinafter referred to as "stable region"). The limit process shown in FIG. 11 is a process of moving the combinations of the model parameters a1' and a2' which are in the outside of the stable region into the stable region (at positions indicated by "○" symbols).

In step S81, it is determined whether or not the model parameter a2' is greater than or equal to a predetermined a2 lower limit value XIDA2L. The predetermined a2 lower limit value XIDA2L is set to a negative value greater than "−1". Stable corrected model parameters a1 and a2 are obtained when setting the predetermined a2 lower limit value XIDA2L to "−1". However, the predetermined a2 lower limit value XIDA2L is set to a negative value greater than "−1" because the matrix A defined by the following equation (43) to the "n"th power may occasionally become unstable (which means that the model parameters a1' and a2' do not diverge, but oscillate).

$$A = \begin{bmatrix} a1' & a2' \\ 1 & 0 \end{bmatrix} \quad (43)$$

If a2' is less than XIDA2L in step S81, the corrected model parameter a2 is set to the lower limit value XIDA2L, and an a2 stabilizing flag FA2STAB is set to "1" (step S82). When the a2 stabilizing flag FA2STAB is set to "1", this indicates that the corrected model parameter a2 is set to the lower limit value XIDA2L. In FIG. 12, the correction of the model parameter in a limit process P1 of steps S81 and S82 is indicated by the arrow lines with "P1".

If the answer to the step S81 is affirmative (YES), i.e., if a2' is greater than or equal to XIDA2L, the corrected model parameter a2 is set to the model parameter a2' in step S83.

In steps S84 and S85, it is determined whether or not the model parameter a1' is in a range defined by a predetermined a1 lower limit value XIDA1L and a predetermined a1 upper limit value XIDA1H. The predetermined a1 lower limit value XIDA1L is set to a value which is equal to or greater than "−2" and lower than "0", and the predetermined a1 upper limit value XIDA1H is set to "2", for example.

If the answers to steps S84 and S85 are affirmative (YES), i.e., if a1' is greater than or equal to XIDA1L and less than or equal to XIDA1H, the corrected model parameter a1 is set to the model parameter a1' in step S88.

If a1' is less than XIDA1L, the corrected model parameter a1 is set to the lower limit value XIDA1L and an a1 stabilizing flag FA1STAB is set to "1" (steps S84, S86). If a1' is greater than XIDA1H, the corrected model parameter a1 is set to the upper limit value XIDA1H and the a1 stabilizing flag FA1STAB is set to "1" (steps S85, S87. When the a1 stabilizing flag FA1STAB is set to "1", this indicates that the corrected model parameter a1 is set to the lower limit value XIDA1L or the upper limit value XIDA1H. In FIG. 12, the correction of the model parameter in a limit process P2 of steps S84 through S87 is indicated by the arrow lines with "P2".

In step S90, it is determined whether or not the sum of the absolute value of the corrected model parameter a1 and the corrected model parameter a2 is less than or equal to a predetermined stability determination value XA2STAB. The predetermined stability determi-nation value XA2STAB is set to a value close to "1" but less than "1" (e.g., "0.99").

Straight lines L1 and L2 shown in FIG. 12 satisfy the following equation (44).

$$a2+|a1|=XA2\text{STAB} \quad (44)$$

Therefore, in step S90, it is determined whether or not the combination of the corrected model parameters a1 and a2 is placed at a position on or lower than the straight lines L1 and L2 shown in FIG. 12. If the answer to step S90 is affirmative (YES), the limit process immediately ends, since the combination of the corrected model parameters a1 and a2 is in the stable region shown in FIG. 12.

If the answer to step S90 is negative (NO), it is determined whether or not the corrected model parameter a1 is less than or equal to a value obtained by subtracting the predetermined a2 lower limit value XIDA2L from the predetermined stability determination value XA2STAB in step S91 (since XIDA2L is less than "0", XA2STAB−XIDA2L is greater than XA2STAB). If the corrected model parameter a1 is equal to or less than (XA2STAB−XIDA2L), the corrected model parameter a2 is set to (XA2STAB−|a1|) and the a2 stabilizing flag FA2STAB is set to "1" in step S92.

If the corrected model parameter a1 is greater than (XA2STAB−XIDA2L) in step S91, the corrected model parameter a1 is set to (XA2STAB−XIDA2L) in step S93. Further in step S93, the corrected model parameter a2 is set to the predetermined a2 lower limit value XIDA2L, and the a1 stabilizing flag FA1STAB and the a2 stabilizing flag FA2STAB are set to "1" in step S93.

In FIG. 12, the correction of the model parameter in a limit process P3 of steps S91 and S92 is indicated by the arrow lines with "P3", and the correction of the model parameter in a limit processP4 in steps S91 and S93 is indicated by the arrow lines with "P4".

As described above, the limit process shown in FIG. 11 is carried out to bring the model parameters a1' and a2' into the stable region shown in FIG. 12, thus calculating the corrected model parameters a1 and a2.

FIG. 13 is a flowchart showing a limit process of the model parameter b1', which is carried out in step S73 shown in FIG. 10.

In steps S101 and S102, it is determined whether or not the model parameter b1' is in a range defined by a predetermined b1 lower limit value XIDB1L and a predetermined b1 upper limit value XIDB1H. The predetermined b1 lower limit value XIDB1L is set to a positive value (e.g., "0.1"), and the predetermined b1 upper limit value XIDB1H is set to "1", for example.

If the answers to steps S101 and S102 are affirmative (YES), i.e., if b1' is greater than or equal to XIDB1L and less than or equal to XIDB1H, the corrected model parameter b1 is set to the model parameter b1' in step S105.

If b1' is less than XIDB1L in step S101, the corrected model parameter b1 is set to the lower limit value XIDB1L, and a b1 limiting flag FB1LMT is set to "1" in step S104. If b1' is greater than XIDB1H in step S102, then the corrected model parameter b1 is set to the upper limit value XIDB1H, and the b1 limiting flag FB1LMT is set to "1" in step S103. When the b1 limiting flag FB1LMT is set to "1", this indicates that the corrected model parameter b1 is set to the lower limit value XIDB1L or the upper limit value XIDB1H.

FIG. 14 is a flowchart showing a limit process of the model parameter c1', which is carried out in step S74 shown in FIG. 10.

In steps S111 and S112, it is determined whether or not the model parameters c1' is in a range defined by a predetermined c1 lower limit value XIDC1L and a predetermined c1 upper limit value XIDC1H. The predetermined c1 lower limit value XIDC1L is set to "−60", for example, and the predetermined c1 upper limit value XIDC1H is set to "60", for example.

If the answers to steps S111 and S112 are affirmative (YES), i.e., if c1' is greater than or equal to XIDC1L and less than or equal to XIDC1H, the corrected model parameter c1 is set to the model parameter c1' in step S115.

If c1' is less than XIDC1L, the corrected model parameter c1 is set to the lower limit value XIDC1L, and a c1 limiting flag FC1LMT is set to "1" (steps S111, S114. If c1' is greater than XIDC1H, the corrected model parameter c1 is set to the upper limit value XIDC1H, and the c1 limiting flag FC1LMT is set to "1" (steps S112, S113. When the c1 limiting flag FC1LMT is set to "1", this indicates that the corrected model parameter c1 is set to the lower limit value XIDC1L or the upper limit value XIDC1H.

FIG. 15 is a flowchart showing a USLE calculation process executed in step S18 of FIG. 5.

Figure 16:
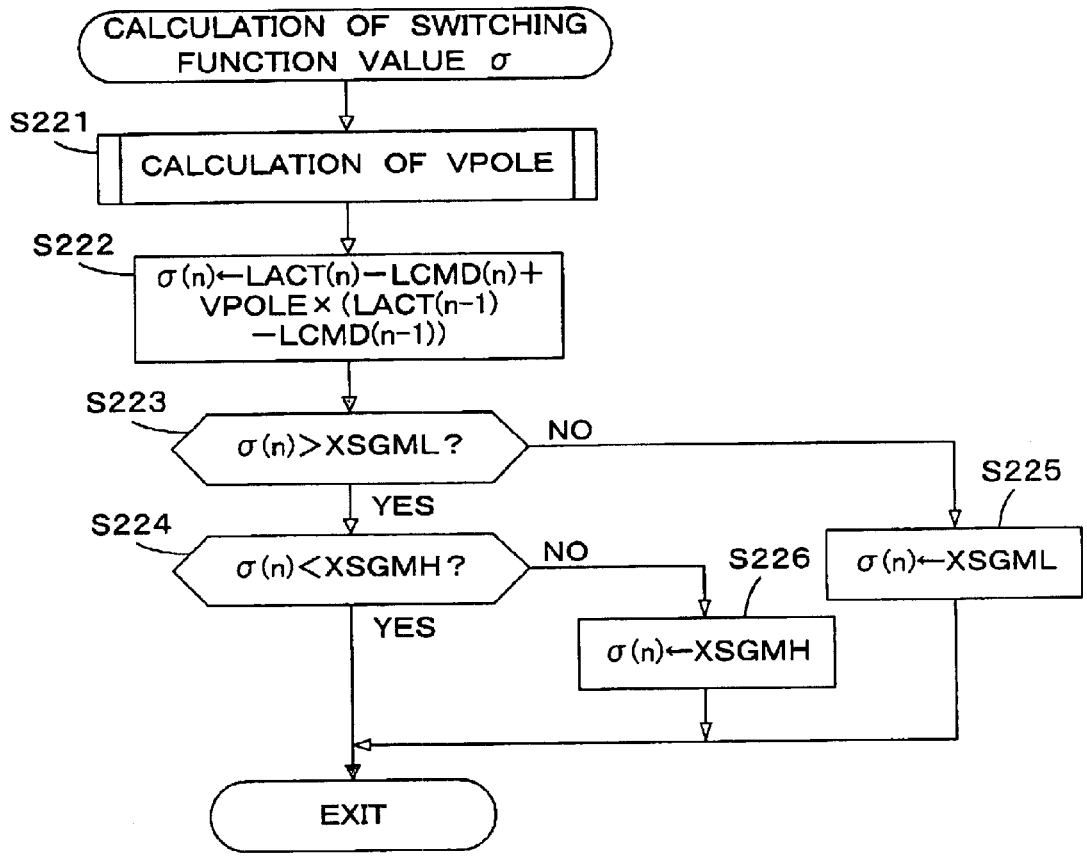
FIG. 16 is a flowchart showing a process of calculating a switching function value (σ), executed in the process shown in FIG. 15.
Figure 19:
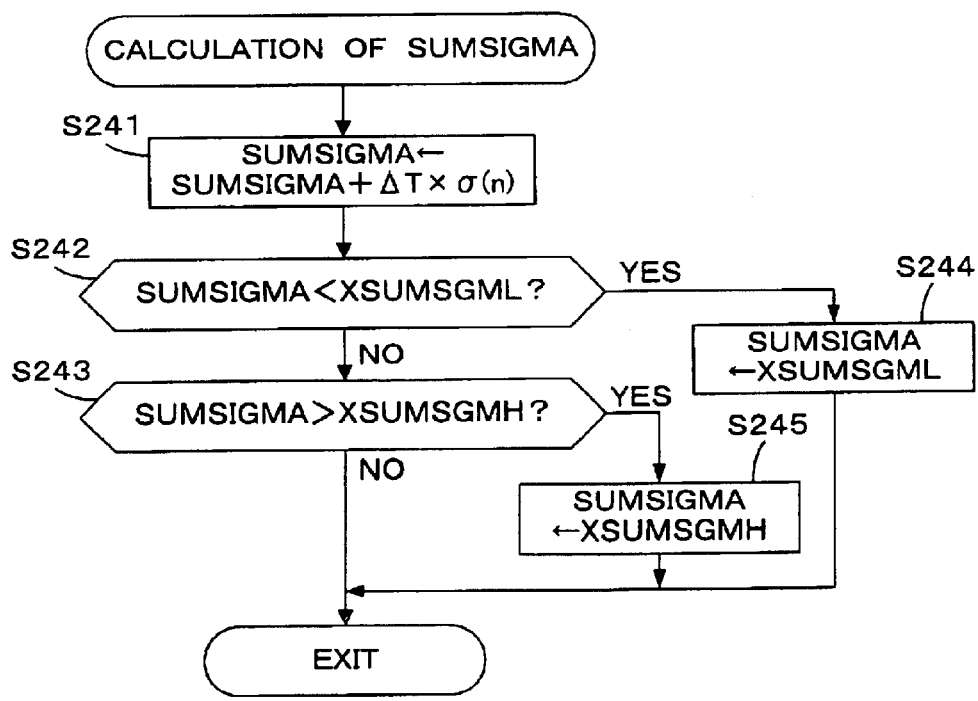
FIG. 19 is a flowchart showing a calculation process of an accumulated value (SUMSIGMA) of the switching function value, executed in the process shown in FIG. 15.

In step S201, a process of calculating a switching function value σ shown in FIG. 16 is carried out to calculate the switching function value σ. In step S202, a SUMSIGMA calculation process shown in FIG. 19 is carried out to calculate an accumulated value SUMSIGMA of the switching function value σ.

Figure 20:
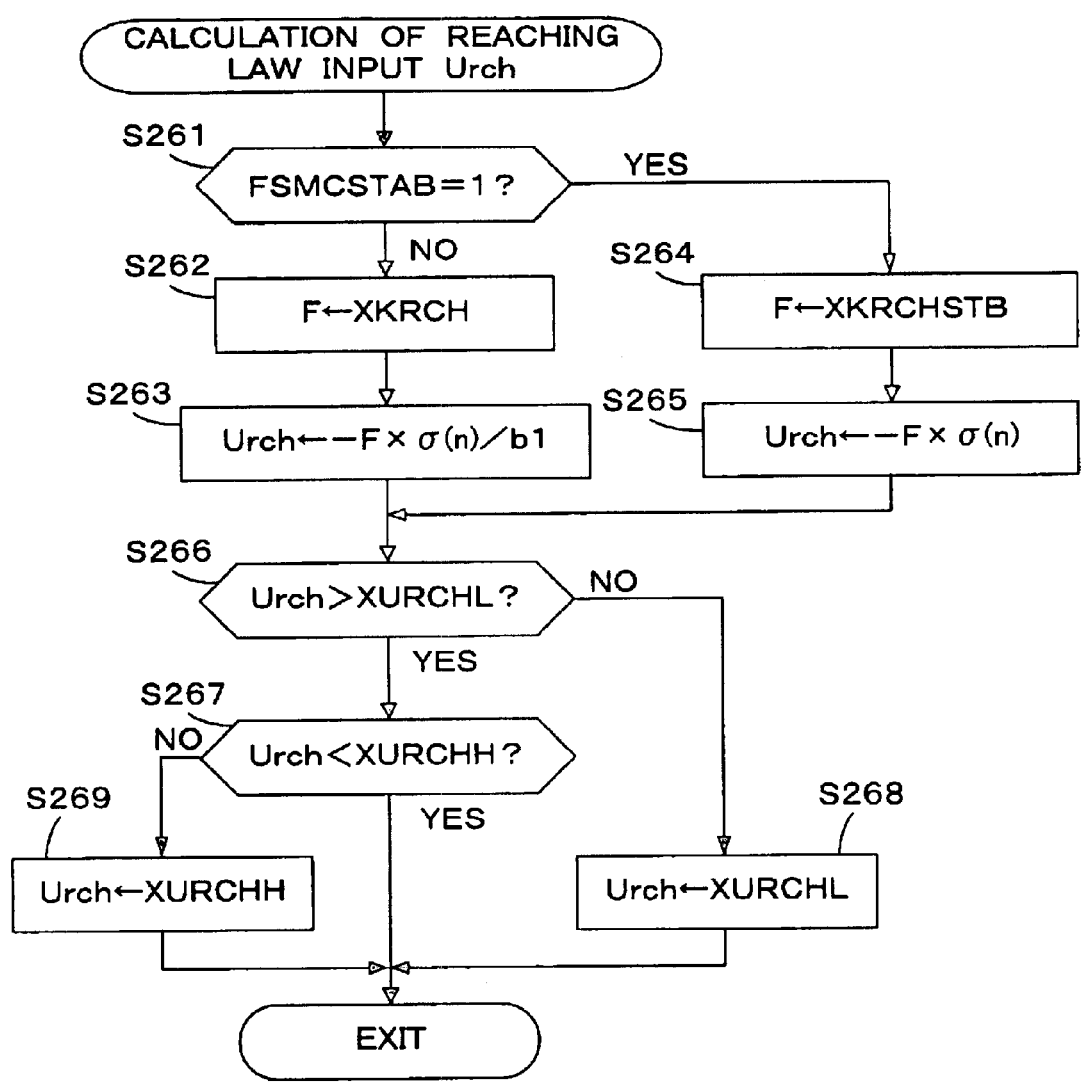
FIG. 20 is a flowchart showing a process of calculating a reaching law input (Urch) in the process shown in FIG. 15.
Figure 21:
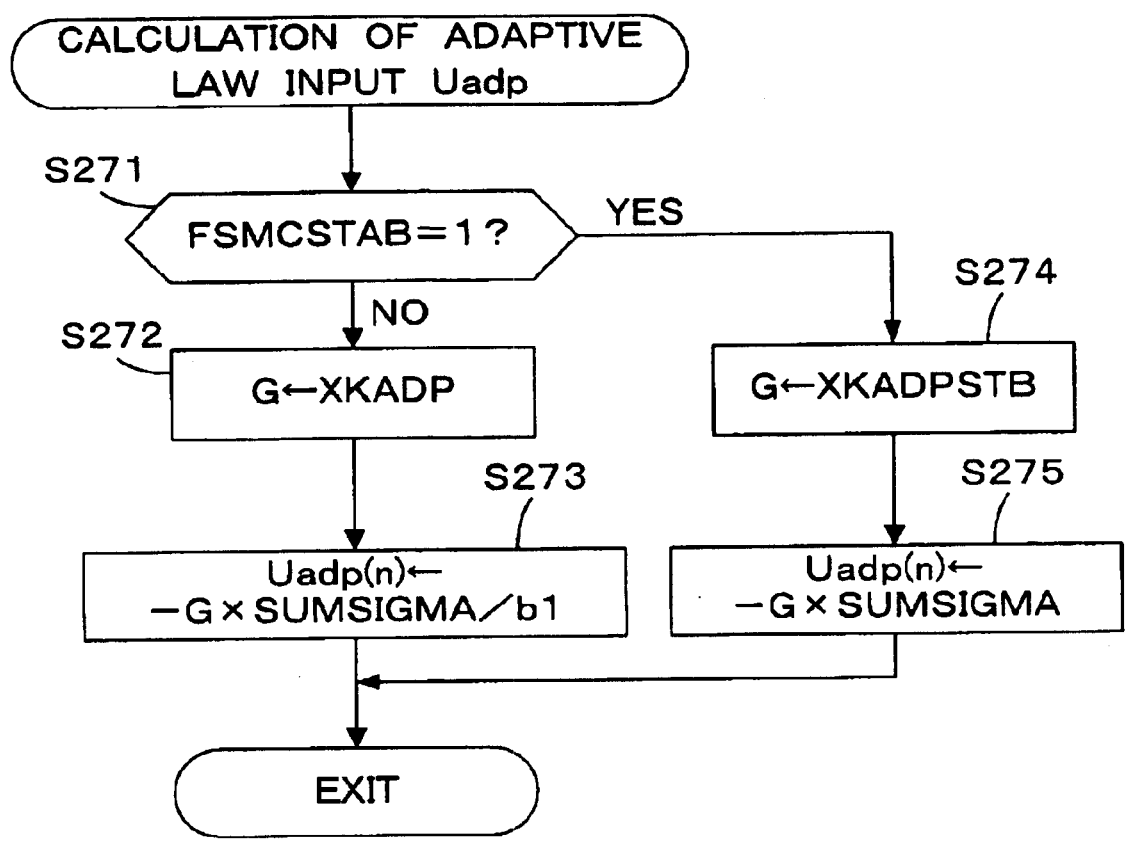
FIG. 21 is a flowchart showing a process of calculating an adaptive law input (Uadp) in the process shown in FIG. 15.

In step S203, the equivalent control input Ueq is calculated by the equation (8a). In step S204, a process of calculating the reaching law input Urch shown in FIG. 20 is carried out, and in step S205, a process of calculating the adaptive law input Uadp shown in FIG. 21 is carried out. In step S207, the damping input Udamp is calculated by the equation (13).

Figure 22:
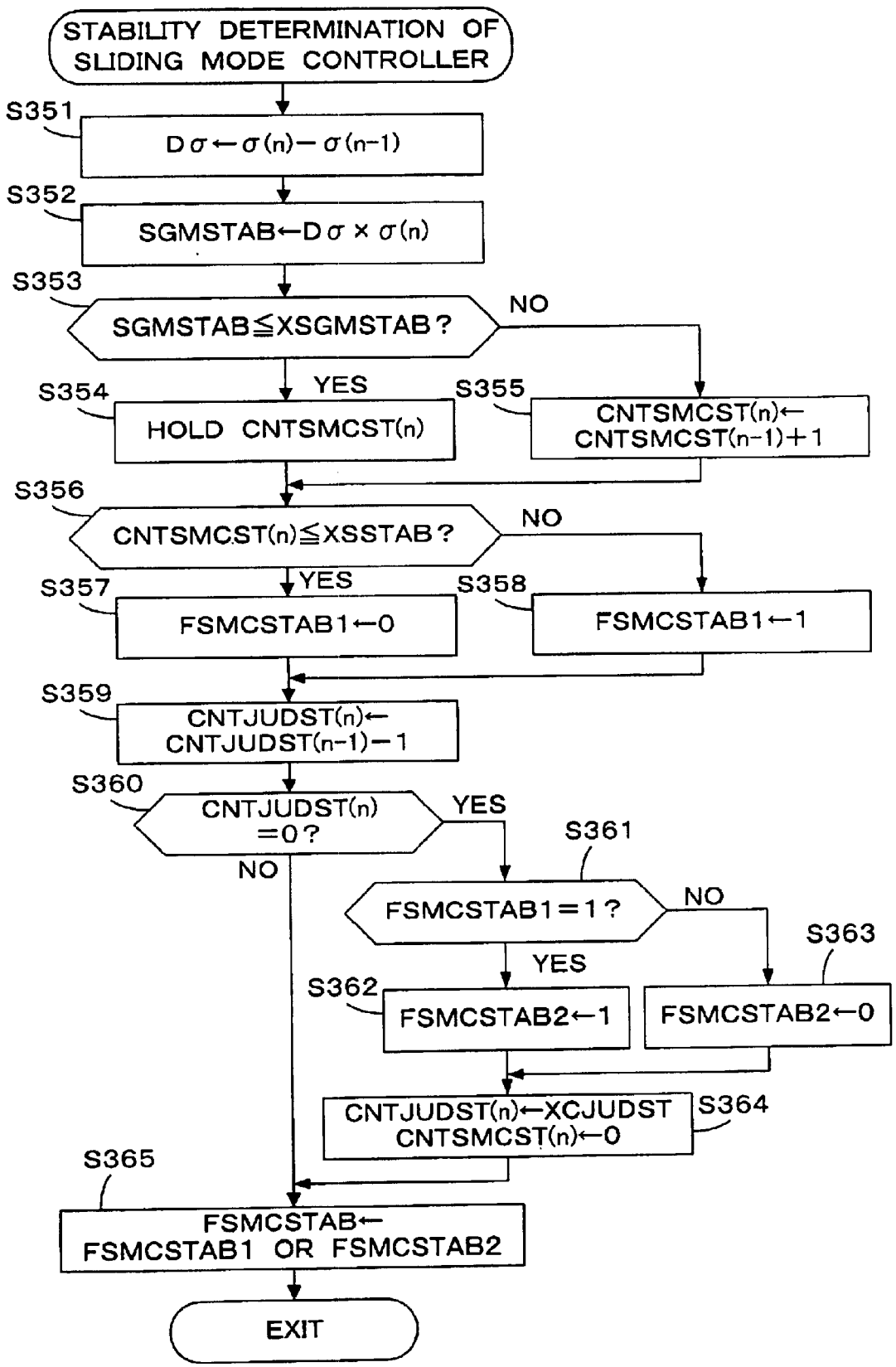
FIG. 22 is a flowchart showing a process of determining stability of the sliding mode controller in the process shown in FIG. 15.

In step S208, it is determined whether or not a stability determination flag FSMCSTAB set in a process shown in FIG. 22 is "1". When the stability determination flag FSMC-STAB is set to "1", this indicates that the adaptive sliding mode controller 41 is unstable.

If FSMCSTAB is equal to "0" in step S208, indicating that the adaptive sliding mode controller 41 is stable, then the control inputs Ueq, Urch, Uadp, and Udamp calculated in steps S203 through S207 are added, thereby calculating the control amount Usl in step S209.

If FSMCSTAB is equal to "1" in step S208, indicating that the adaptive sliding mode controller 41 is unstable, then the sum of the reaching law input Urch and the adaptive law input Uadp is calculated as the control amount Usl. In other words, the equivalent control input Ueq, and the damping input Udamp are not used for calculating the control amount Usl. This prevents the control system from becoming unstable.

In step S211, the control amount Usl, the non-operative duty DEADDUTY, the battery voltage VB, and the reference voltage VBREF are applied to the following equation (45) to calculate a duty ratio USLE.

$$USLE=(Usl+\text{DEADDUTY})\times VBREF/VB \quad (45)$$

In step S212, a limit process of the duty ratio USLE is performed. Specifically, if the duty ratio USLE is in the range between a predetermined upper limit value and a predetermined lower limit value, the duty ratio USLE is kept unchanged. If the duty ratio USLE is greater than the predetermined upper limit value, the duty ratio USLE is set to the predetermined upper limit value, and if the duty ratio USLE is less than the predetermined lower limit value, the duty ratio USLE is set to the predetermined lower limit value.

In step S213, a stability determination process of the sliding mode controller shown in FIG. 22 is carried out. In this process, the stability determination flag FSMCSTAB is set.

FIG. 16 is a flowchart showing a process of calculating the switching function value a which is carried out in step S201 of FIG. 15.

Figure 17:
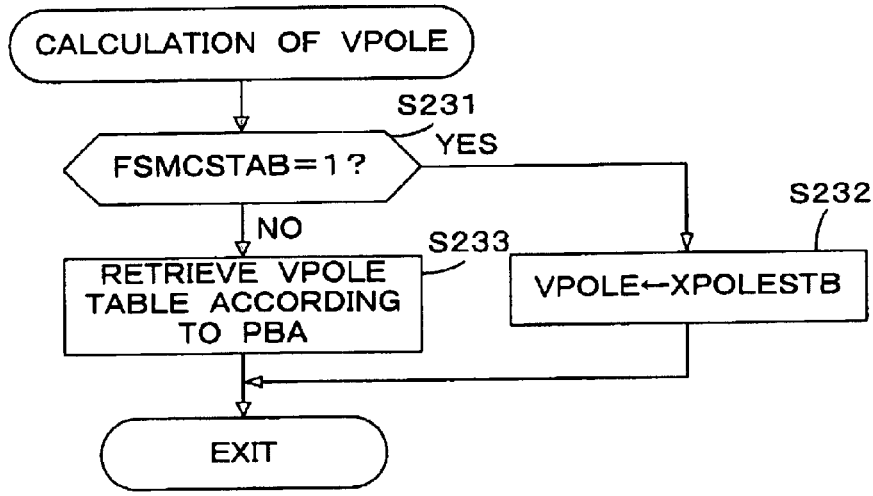
FIG. 17 is a flowchart showing a process of calculating a switching function setting parameter (VPOLE) in the process shown in FIG. 16.

In step S221, a VPOLE calculation process shown in FIG. 17 is carried out to calculate the switching function setting parameter VPOLE. In step S222, the switching function value σ (n) is calculated from the equation (5).

In steps S223 and S224, it is determined whether or not the calculated switching function value σ (n) is in a range defined by a predetermined upper limit value XSGMH and a predetermined lower limit value XSGML. If the calculated switching function value σ (n) is in this range, then this process immediately ends. If the calculated switching function value σ (n) is equal to or less than the predetermined lower limit value XSGML, then the calculated switching function value σ (k) is set to the predetermined lower limit value XSGML (steps S223 and S225). If the calculated switching function value σ (n) is equal to or greater than the predetermined upper limit value XSGMH, then the calculated switching function value σ (n) is set to the predetermined upper limit value XSGMH (steps S224 and S226).

FIG. 17 shows the VPOLE calculation process executed in step S221 of FIG. 16.

In step S231, it is determined whether or not the stability determination flag FSMCSTAB is "1". If FSMCSTAB is equal to "1", indicating that the adaptive sliding mode controller 41 is unstable, then the switching function setting parameter VPOLE is set to a predetermined stabilizing value XPOLESTB in step S232. The predetermined stabilizing value XPOLESTB is set to a value greater than "−1"but very close to "−1" (e.g., "−0.999").

Figure 18:
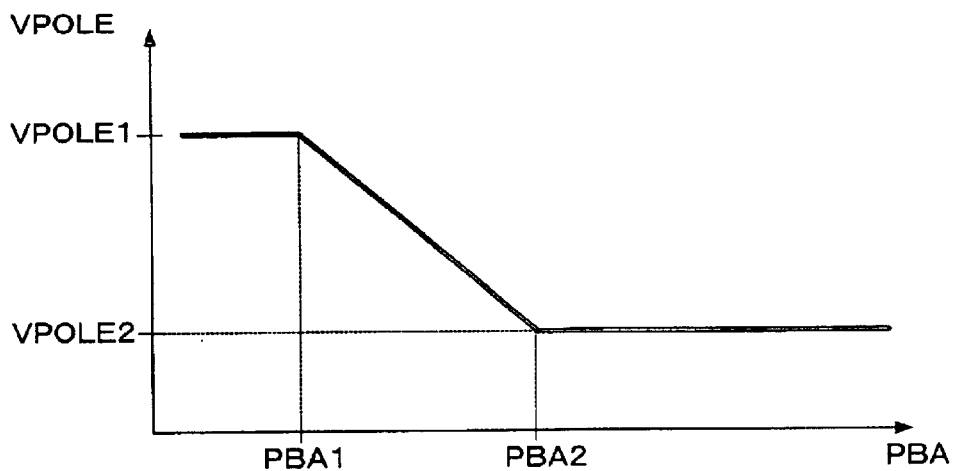
FIG. 18 is a diagram showing a table used in the process shown in FIG. 17.

If FSMCSTP is equal to "0", indicating that the adaptive sliding mode controller 41 is stable, a VPOLE table shown in FIG. 18 is retrieved according to the absolute intake pressure PBA to calculate the switching function setting parameter VPOLE (step S233). In the VPOLE table, a first set value VPOLE1 (e.g., −0.3) is set corresponding to the absolute intake pressure PBA which is lower than a first predetermined pressure PBA1 (e.g., 35 kPa (260 mmHg)), and a second set value VPOLE2 (e.g., −0.5) is set corresponding to the absolute intake pressure PBA which is higher than a second predetermined pressure PBA2 (e.g., 61 kPa (460 mmHg)). Further, the VPOLE table is set so that the switching function setting parameter VPOLE decreases as the absolute intake pressure PBA increases, if the absolute intake pressure PBA is in the range between the first predetermined pressure PBA1 and the second predetermined pressure PBA2.

Figure 23:
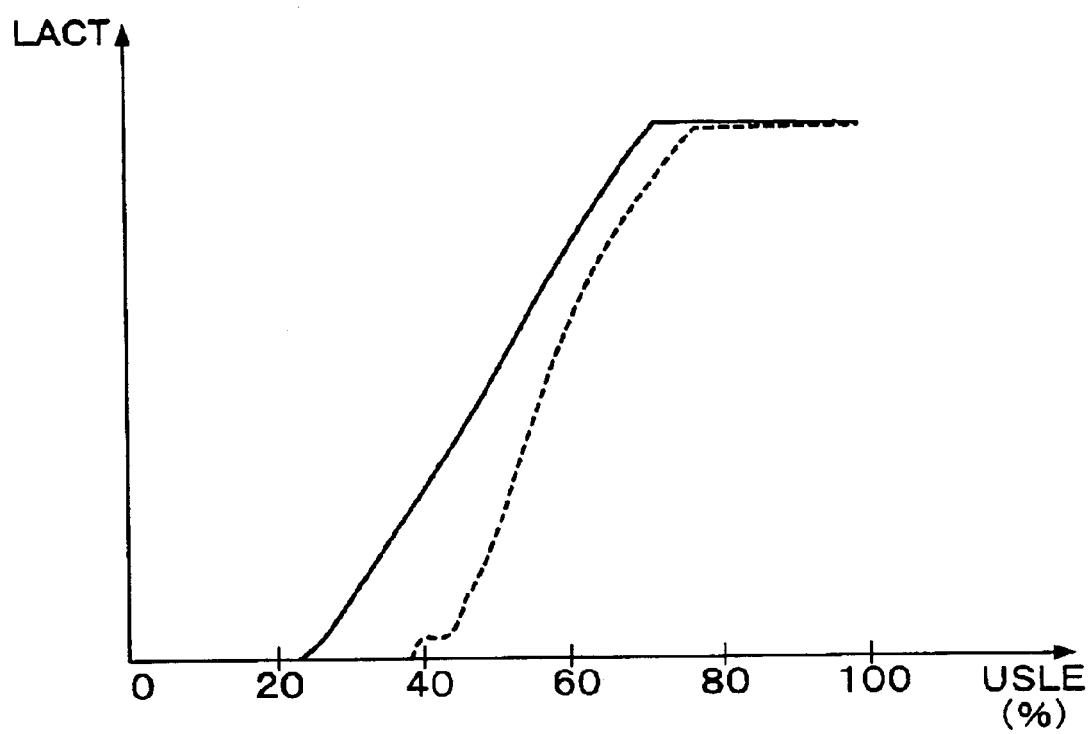
FIG. 23 is a diagram showing operating characteristics of the exhaust gas recirculation valve.

FIG. 23 shows operating characteristics of the EGR valve 22. The solid line in FIG. 23 corresponds to a characteristic when the absolute intake pressure PBA equals 101 kPa (760 mmHg), and the broken line in FIG. 23 corresponds to a characteristic when the absolute intake pressure PBA equals 55 kPa (410 mmHg). As apparent from FIG. 23, the operating characteristic of the EGR valve 22 greatly changes depending on the absolute intake pressure PBA. However, it is difficult to rapidly and appropriately correct the model parameter vector θ according to a change in the absolute intake pressure PBA. For the change in the operating characteristic as shown in FIG. 23, it is theoretically possible to maintain the controllability at similar level by changing the model parameter b1. However, it is actually difficult to rapidly identify the model parameter b1, since the reference model parameter b1base is set to a fixed value. Further, it is not preferable to enlarge a range of values that the model parameter b1 can take, since the model parameter b1 greatly affects values of the control inputs Ueq, Urch, and Uadp (the model parameter b1 is used as a denominator in the equations for calculating these control inputs).

Therefore, in the present embodiment, the switching function setting parameter VPOLE is set according to the absolute intake pressure PBA as shown in FIG. 18. This makes it possible to improve the follow-up rate of the actual lift amount LACT toward the lift amount command value LCMD in a low load (low PBA) operating condition, to thereby maintain good controllability.

FIG. 19 is a flowchart showing a process of calculating the accumulated value SUMSIGMA of the switching function value σ, which is executed in step S202 of FIG. 15.

In step S241, the accumulated value SUMSIGMA is calculated by the following equation (46).

$$\text{SUMSIGMA} = \text{SUMSIGMA} + \Delta T \times \sigma(n) \tag{46}$$

where ΔT is a sampling period, and SUMSIGMA on the right side is a preceding calculated value.

In step S242, it is determined whether or not the accumulated value SUMSIGMA is less than a lower limit value XSUMSGML. If SUMSIGMA is less than XSUMSGML, the accumulated value SUMSIGMA is set to the lower limit value XSUMSGML (step S244). If SUMSIGMA is greater than or equal to XSUMSGML, it is determined whether or not the accumulated value SUMSIGMA is greater than an upper limit value XSUMSGMH (step S243). If SUMSIGMA is greater than XSUMSGMH, the accumulated value SUMSIGMA is set to the upper limit value XSUMSGMH (step S245).

FIG. 20 is a flowchart showing a process of calculating the reaching law input Urch, which is carried out in step S204 of FIG. 15.

In step S261, it is determined whether or not the stability determination flag FSMCSTAB is "1". If the stability determination flag FSMCSTAB is "0", indicating that the adaptive sliding mode controller 41 is stable, the control gain F is set to a normal gain XKRCH in step S262.

The reaching law input Urch is calculated from the equation (9) described above (step S263).

If the stability determination flag FSMCSTAB is "1", indicating that the adaptive sliding mode controller 41 is unstable, the control gain F is set to a predetermined stabilizing gain XKRCHSTB in step S264, and the reaching law input Urch is calculated from the following equation (47), which does not include the model parameter b1 (step S265).

$$Urch = -F \times \sigma(n) \tag{47}$$

In steps S266 and S267, it is determined whether the calculated reaching law input Urch is in a range defined between a predetermined upper limit value XURCHH and a predetermined lower limit value XURCHL. If the reaching law input Urch is in the range between XURCHH and XURCHL, the process immediately ends. If the reaching law input Urch is less than or equal to the predetermined lower limit value XURCHL, the reaching law input Urch is set to the predetermined lower limit value XURCHL (steps S266 and S268). If the reaching law input Urch is greater than or equal to the predetermined upper limit value XURCHH, the reaching law input Urch is set to the predetermined upper limit value XURCHH (steps S267 and S269).

As described above, when the adaptive sliding mode controller 41 becomes unstable, the control gain F is set to the predetermined stabilizing gain XKRCHSTB, and the reaching law input Urch is calculated without using the model parameter b1, which brings the adaptive sliding mode controller 41 back to its stable state. When the identifying process carried out by the model parameter identifier 42 becomes unstable, the adaptive sliding mode controller 41 becomes unstable. Therefore, by using the equation (47) that does not include the model parameter b1 which has become unstable, the adaptive sliding mode controller 41 can be stabilized.

FIG. 21 is a flowchart showing a process of calculating the adaptive law input Uadp, which is carried out in step S205 of FIG. 15.

In step S271, it is determined whether or not the stability determination flag FSMCSTAB is "1". If the stability determination flag FSMCSTAB is "0", indicating that the adaptive sliding mode controller 41 is stable, the control gain G is set to a normal gain XKADP in step S272.

Next, the adaptive law input Uadp is calculated by applying the accumulated value SUMSIGMA, the control gain G, and the model parameter b1 to the following equation (48). The equation (48) is obtained by replacing the accumulated value $\Sigma \Delta T \sigma$ in the equation (10) with the accumulated value SUMSIGMA.

$$Uadp = -G \times SUMSIGMA/b1 \qquad (48)$$

If the stability determination flag FSMCSTAB is "1", indicating that the adaptive sliding mode controller 41 is unstable, the control gain G is set to a predetermined stabilizing gain XKADPSTB in step S274, and the adaptive law input Uadp is calculated from the following equation (49) (step S275). The equation (49) is obtained by deleting the model parameter b1 in the equation (48).

$$Uadp = -G \times SUMSIGMA \qquad (49)$$

FIG. 22 is a flowchart showing a process of determining the stability of the sliding mode controller, which is carried out in step S213 of FIG. 15. In this process, the stability is determined based on a differential value of the Lyapunov function, and the stability determination flag FSMCSTAB is set according to the result of the stability determination.

In step S351, a switching function change amount $D\sigma$ is calculated from the following equation (50). Then, a stability determining parameter SGMSTAB is calculated from the following equation (51) (step S352).

$$D\sigma = \sigma(n) - \sigma(n-1) \qquad (50)$$

$$SGMSTAB = D\sigma \times \sigma(n) \qquad (51)$$

In step S353, it is determined whether or not the stability determination parameter SGMSTAB is less than or equal to a stability determining threshold XSGMSTAB. If SGMSTAB is greater than XSGMSTAB, it is determined that the controller 41 may possibly be unstable, and an unstability detecting counter CNTSMCST is incremented by "1" in step S355. If SGMSTAB is less than or equal to XSGMSTAB, the controller 41 is determined to be stable, and the count of the unstability detecting counter CNTSMCST is not incremented but maintained (step S354).

In step S356, it is determined whether or not the value of the unstability detecting counter CNTSMCST is less than or equal to a predetermined count XSSTAB. If CNTSMCST is less than or equal to XSSTAB, the controller 41 is determined to be stable, and a first determination flag FSMCSTAB1 is set to "0" (step S357). If CNTSMCST is greater than XSSTAB, the controller 41 is determined to be unstable, and the first determination flag FSMCSTAB1 is set to "1" (step S358). The value of the unstability detecting counter CNTSMCST is initialized to "0", when the ignition switch is turned on.

In step S359, a stability determining period counter CNTJUDST is decremented by "1". It is determined whether or not the value of the stability determining period counter CNTJUDST is "0" in step S360. The value of the stability determining period counter CNTJUDST is initialized to a predetermined determining count XCJUDST, when the ignition switch is turned on. Initially, therefore, the answer to step S360 is negative (NO), and the process immediately goes to step S365.

If the count of the stability determining period counter CNTJUDST subsequently becomes "0", the process goes from step S360 to step S361, in which it is determined whether or not the first determination flag FSMCSTAB1 is "1". If the first determination flag FSMCSTAB1 is "0", a second determination flag FSMCSTAB2 is set to "0" (step S363). If the first determination flag FSMCSTAB1 is "1", the second determination flag FSMCSTAB2 is set to "1" (step S362).

In step S364, the value of the stability determining period counter CNTJUDST is set to the predetermined determining count XCJUDST, and the unstability detecting counter CNTSMCST is set to "0". Thereafter, the process goes to step S365.

In step S365, the stability determination flag FSMCSTAB is set to the logical sum of the first determination flag FSMCSTAB1 and the second determination flag FSMCSTAB2. The second determination flag FSMCSTAB2 is maintained at "1" until the value of the stability determining period counter CNTJUDST becomes "0", even if the answer to step S356 becomes affirmative (YES) and the first determination flag FSMCSTAB1 is set to "0". Therefore, the stability determination flag FSMCSTAB is also maintained at "1" until the value of the stability determining period counter CNTJUDST becomes "0".

As described above, the EGR valve 22 is controlled so that the lift amount LACT coincides with the lift amount command value LCMD, based on the controlled object model which is obtained by modeling the EGR valve 22. By performing the control based on the controlled object model, it is possible to improve performance that the lift amount LACT follows up the lift amount command value LCMD, and obtain good controllability even in the small lift amount region, compared with the conventional technique such as the PID (Proportional, Integral, and Differential) control that does not use any controlled object model.

The controlled object model is modeled with respect to the operative region REFCT which is obtained by excluding the non-operative region RDEAD where the opening does not change when the control input changes. Accordingly, degradation of controllability in the small opening region, which is caused if the controlled object model is modeled including the non-operative region RDEAD, can be avoided to thereby obtain good controllability over the entire operative region REFCT of the EGR valve 22.

Since the operating characteristic of the EGR valve 22 is greatly affected by changes in the absolute intake pressure PBA, the switching function setting parameter is set according to the absolute intake pressure PBA. This makes it possible to maintain good controllability irrespective of changes in the absolute intake pressure PBA.

In this embodiment, the ECU5 constitutes the control means and the identifying means. More specifically, the adaptive sliding mode controller 41 (step S18 of FIG. 5) corresponds to the control means, and the model parameter identifier 42 and the model parameter scheduler 43 (step S17 of FIG. 5) corresponds to the identifying means.

The present invention is not limited to the above-described embodiment. For example, in the above-described embodiment, the configuration including the voltage correction block 45, the limiter 46, and the inverse voltage correction block 47 is disclosed. However, these elements may not necessarily be essential. In other words, by removing the voltage correction block 45, the limiter 46, and the inverse voltage correction block 47, the duty ratio USLE may be an output of the addition block 44, and the duty ratio USLE may directly be input to the subtraction block 48.

Alternatively, the configuration that includes only one of the voltage correction block 45 and the limiter 46 may be employed. When the voltage correction block 45 is provided, the inverse voltage correction block is correspondingly necessary.

The response-specifying controller that performs a feedback control to make an output of a controlled object coincide with a target value and specifies the damping characteristic of a control deviation of the feedback control process, is not limited to an adaptive sliding mode controller. A controller for performing a back stepping control which realizes control results similar to those of the sliding mode control, may be used as a response-specifying controller.

Further, the present invention is applicable also to the control of an EGR valve provided in a watercraft propulsion engine such as an outboard motor having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control apparatus for an exhaust gas recirculation valve which is provided in an exhaust gas recirculation pipe for recirculating exhaust gases from an internal combustion engine to an intake system of said engine, said exhaust gas recirculation valve controlling an exhaust gas recirculation amount, said control apparatus comprising:
input means for receiving data regarding an operational parameter of said internal combustion engine;
output means for outputting a control signal; and
control means for controlling an opening of said exhaust gas recirculation valve via said control signal to a target opening based on a controlled object model which is obtained by modeling said exhaust gas recirculation valve.

2. A control apparatus according to claim 1, wherein a control characteristic of said exhaust gas recirculation valve includes a non-operative region where the opening of said exhaust gas recirculation valve does not change when a control input to said exhaust gas recirculation valve changes, and said controlled object model is modeled with respect to an operative region which is obtained by excluding said non-operative region.

3. A control apparatus according to claim 1, further including identifying means for identifying at least one model parameter of said controlled object model, wherein said control means performs the control, using the at least one model parameter identified by said identifying means.

4. A control apparatus according to claim 1, wherein said control means controls said exhaust gas recirculation valve with a sliding mode control.

5. A control apparatus according to claim 4, wherein the control input from said control means to said exhaust gas recirculation valve includes an adaptive law control input.

6. A control apparatus according to claim 4, further including intake pressure detecting means for detecting an intake pressure of said engine, wherein said control means controls said exhaust gas recirculation valve, using a switching function defined as a linear function of a deviation between the opening of said exhaust gas recirculation valve and the target opening, and changes the switching function according to the detected intake pressure.

7. A control method for an exhaust gas recirculation valve which is provided in an exhaust gas recirculation pipe for recirculating exhaust gases from an internal combustion engine to an intake system of said engine, said exhaust gas recirculation valve controlling an exhaust gas recirculation amount, said control method comprising the steps of:
a) modeling said exhaust gas recirculation valve to obtain a controlled object model; and
b) controlling an opening of said exhaust gas recirculation valve to a target opening based on said controlled object model.

8. A control method according to claim 7, wherein a control characteristic of said exhaust gas recirculation valve has a non-operative region where the opening of said exhaust gas recirculation valve does not change when a control input to said exhaust gas recirculation valve changes, and said controlled object model is modeled with respect to an operative region which is obtained by excluding said non-operative region.

9. A control method according to claim 7, further including a step of identifying at least one model parameter of said controlled object model, wherein the opening of said exhaust gas recirculation valve is controlled, using the identified at least one model parameter.

10. A control method according to claim 7, wherein said exhaust gas recirculation valve is controlled with a sliding mode control.

11. A control method according to claim 10, wherein the control input to said exhaust gas recirculation valve includes an adaptive law control input.

12. A control method according to claim 10, further including a step of detecting an intake pressure of said engine, wherein said exhaust gas recirculation valve is controlled, using a switching function defined as a linear function of a deviation between the opening of said exhaust gas recirculation valve and the target opening, and the switching function is changed according to the detected intake pressure.

13. A computer program, embodied on a computer-readable medium for causing a computer to carry out a control method for an exhaust gas recirculation valve which is provided in an exhaust gas recirculation pipe for recirculating exhaust gases from an internal combustion engine to an intake system of said engine, said exhaust gas recirculation valve controlling an exhaust gas recirculation amount, said control method comprising the steps of:

a) modeling said exhaust gas recirculation valve to obtain a controlled object model; and
b) controlling an opening of said exhaust gas recirculation valve to a target opening based on said controlled object model.

14. A computer program according to claim 13, wherein a control characteristic of said exhaust gas recirculation valve has a non-operative region where the opening of said exhaust gas recirculation valve does not change when a control input to said exhaust gas recirculation valve changes, and said controlled object model is modeled with respect to an operative region which is obtained by excluding said non-operative region.

15. A computer program according to claim 13, wherein said control method further includes a step of identifying at least one model parameter of said controlled object model, wherein the opening of said exhaust gas recirculation valve is controlled, using the identified at least one model parameter.

16. A computer program according to claim 13, wherein said exhaust gas recirculation valve is controlled with a sliding mode control.

17. A computer program according to claim 16, wherein the control input to said exhaust gas recirculation valve includes an adaptive law control input.

18. A computer program according to claim 16, wherein said control method further includes a step of detecting an intake pressure of said engine, wherein said exhaust gas recirculation valve is controlled, using a switching function defined as a linear function of a deviation between the opening of said exhaust gas recirculation valve and the target opening, and the switching function is changed according to the detected intake pressure.

19. A control system for an internal combustion engine, said control system comprising:
an exhaust gas recirculation valve disposed in an exhaust gas recirculation pipe of said internal combustion engine; and
a controller for controlling an opening of said exhaust gas recirculation valve to a target opening based on a controlled object model obtained by modeling said exhaust gas recirculation valve,
wherein said exhaust gas recirculation valve controls an exhaust gas recirculation amount via said operation of said controller.

20. A control system for an exhaust gas recirculation valve provided in an exhaust gas recirculation pipe for recirculating exhaust gases in an internal combustion engine, said system comprising:
modeling means for modeling said exhaust gas recirculation valve to obtain a controlled object model; and
controlling means for controlling an opening of said exhaust gas recirculation valve to a target opening based on said controlled object model,
wherein said controlling means thereby controls an exhaust gas recirculation amount.

* * * * *